United States Patent
al-Salem et al.

(10) Patent No.: US 9,538,126 B2
(45) Date of Patent: Jan. 3, 2017

(54) SUPER-RESOLUTION OF DYNAMIC SCENES USING SAMPLING RATE DIVERSITY

(71) Applicant: King Abdulaziz City for Science and Technology, Riyadh (SA)

(72) Inventors: Faisal M. al-Salem, Riyadh (SA); Andrew E. Yagle, Ann Arbor, MI (US)

(73) Assignee: KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 0 days.

(21) Appl. No.: 14/559,515

(22) Filed: Dec. 3, 2014

(65) Prior Publication Data

US 2016/0163021 A1    Jun. 9, 2016

(51) Int. Cl.
| | | |
|---|---|---|
| G06K 9/32 | (2006.01) |
| H04N 7/01 | (2006.01) |
| G06T 7/20 | (2006.01) |
| G06T 7/00 | (2006.01) |
| G06K 9/62 | (2006.01) |

(Continued)

(52) U.S. Cl.
CPC .......... *H04N 7/0135* (2013.01); *G06K 9/3233* (2013.01); *G06K 9/6201* (2013.01); *G06K 9/6234* (2013.01); *G06K 9/6247* (2013.01); *G06T 3/4053* (2013.01); *G06T 5/002* (2013.01); *G06T 5/003* (2013.01); *G06T 5/009* (2013.01); *G06T 5/50* (2013.01); *G06T 7/004* (2013.01); *G06T 7/208* (2013.01); *G06T 7/2033* (2013.01); *H04N 7/0117* (2013.01); *H04N 7/0152* (2013.01); *G06T 2200/12* (2013.01); *G06T 2207/20182* (2013.01); *G06T 2207/20201* (2013.01); *G06T 2207/20208* (2013.01); *G06T 2207/20221* (2013.01); *G06T 2207/30241* (2013.01)

(58) Field of Classification Search
CPC .. G06T 3/4053; H04N 5/2258; H04N 5/23232
See application file for complete search history.

(56) References Cited

U.S. PATENT DOCUMENTS

| 8,665,342 B2 | 3/2014 | Al-Salem et al. |
| 2015/0154739 A1* | 6/2015 | Choudhury ............... G06T 5/00 382/266 |

(Continued)

OTHER PUBLICATIONS

Salem et al., "Non-Parametric Super-Resolution Using a Bi-Sensor Camera," IEEE Transactions on Multimedia, Jan. 2013, vol. 15, No. 1, pp. 27-40.

(Continued)

*Primary Examiner* — Phuoc Tran
(74) *Attorney, Agent, or Firm* — Andrew M. Calderon; Roberts Mlotkowski Safran Cole & Calderon, P.C.

(57) ABSTRACT

Super-resolution of dynamic scenes using sampling rate diversity, processes and systems thereof are provided. The method implementing the processes includes: in a first stage, super-resolving secondary low-resolution (LR) images using a set of primary LR images to create LR dictionaries to represent polyphase components (PPCs) of high resolution (HR) patches of images; and, in a second stage, reverting to a single frame super-resolution (SR) applied to each frame which comprises an entire image, using the HR dictionaries extracted from the super-resolved sequence obtain in the first stage.

12 Claims, 15 Drawing Sheets

(51) Int. Cl.
| | |
|---|---|
| G06T 5/00 | (2006.01) |
| G06T 5/50 | (2006.01) |
| H04N 7/015 | (2006.01) |
| G06T 3/40 | (2006.01) |

(56) References Cited

U.S. PATENT DOCUMENTS

2016/0078600 A1* 3/2016 Perez Pellitero et al. ............ G06T 3/4053 382/155
2016/0117800 A1* 4/2016 Korkin ............ G06T 3/4053 348/239

OTHER PUBLICATIONS

Horn et al., "Determining Optical Flow," Artificial Intelligence, 1981, vol. 17, pp. 185-203.
Lin et al., "Fundamental Limits of Reconstruction-Based Super-resolution Algorithms Under Local Translation," IEEE, Jan. 2004, vol. 26, No. 1, 15 pages.
Babacan et al., "Variational Bayesian Super Resolution," IEEE Transactions on Image Processing, Apr. 2011, vol. 20, No. 4, pp. 984-999.
Chung et al., "Numerical Methods for Coupled Superresolution," Inverse Problems, Dec. 16, 2005, 19 pages.
Robinson et al.,"Optimal Registration of Aliased Images Using Variable Projection With Applications to Super-Resolution," Computer Journal, Apr. 12, 2007, 12 pages.
Liu et al., "On Bayesian Adaptive Video Super Resolution," IEEE, Feb. 2014, vol. 36, No. 2, pp. 346-360.
Protter et al.,"Generalizing the Nonlocal-Means to Super-Resolution Reconstruction," IEEE, Jan. 2009, vol. 18, No. 1, pp. 36-51.
Takeda et al., "Super-Resolution Without Explicit Subpixel Motion Estimation," IEEE, Sep. 2009, vol. 18, No. 9, pp. 1958-1975.
Yang et al., "Image Super-Resolution via Sparse Representation," IEEE, 2010, 13 pages.
Dong et al., "Image Deblurring and Superresolution by Adaptive Sparse Domain Selection and Adaptive Regularization," IEEE, Jul. 2011, vol. 20, No. 7, pp. 1838-1857.
Yang et al., "Coupled Dictionary Training for Image Super-Resolution," IEEE , Aug. 2012, vol. 21, No. 8, pp. 3467-3478.
S. Yang et al., "Single-Image Super-Resolution Reconstruction . . . Dictionaries and Clustered Sparse Coding," IEEE, Sep. 2012, vol. 21, No. 9, pp. 4016-4028.
Dong et al., "Sparse Representation Based Image Interpolation With Nonlocal Autoregressive Modeling," IEEE, Apr. 2013, vol. 22, No. 4, pp. 1382-1394.
Trinh et al., "Novel Example-Based Method for Super-Resolution and Denoising of Medical Images," IEEE, Apr. 2014, vol. 23, No. 4, pp. 1882-1895.
Purkait et al., "A Fuzzy-rule-based approach for single frame super resolution," IEEE, May 2014, vol. 23, No. 5, pp. 2277-2290.
Peleg et al.,"A Statistical Prediction . . . Image Super-resolution," IEEE, Jun. 2014, vol. 23, No. 6, pp. 2569-2582.
Lu et al., "Alternatively Constrained Dictionary Learning for Image Superresolution," IEEE, Mar. 2014, vol. 44, No. 3, pp. 366-377.
Polatkan et al., "A Bayesian Nonparametric Approach to Image Super-resolution," IEEE, 2013, 14 pages.
Candes et al., "An Introduction to Compressive . . . Against the Common Knowledge in Data Acquisition," IEEE, Mar. 2008, pp. 21-30.
Wright et al., "Robust Face Recognition via Sparse Representation," IEEE, Feb. 2009, vol. 31, No. 2, pp. 210-227.
Chen et al., "Atomic Decomposition by Basis Pursuit," SIAM Journal on Scientific Computing, 1998, 29 pages.
Tosic et al., "Dictionary Learning," IEEE , Mar. 2011, vol. 28, No. 2, pp. 27-38.
Zhang et al., "Single Image Super-resolution With Non-local Means and Steering Kernel Regression," IEEE, Nov. 2012, vol. 21, No. 11, pp. 4544-4556.
Elad et al., "On the Role of Sparse and Redundant Representations in Image Processing," Proceedings of the IEEE, Jun. 2010, vol. 98, No. 6, pp. 972-982.
Yu et al., "Solving Inverse Problems with . . . From Gaussian Mixture Models to Structured Sparsity," IEEE, May 2012, vol. 21, No. 5, pp. 2481-2499.
Peng et al., "Feature Selection Based on Mutual Information: Criteria of Max-dependency, Max-relevance, and Minredundancy," IEEE, Aug. 2005, vol. 27, No. 8, pp. 1226-1238.
Takeda et al., "Kernel Regression for Image Processing and Reconstruction," IEEE, Feb. 2007, vol. 16, No. 2, pp. 349-366.
Golub et al., "Matrix Computations," Third Edition, Baltimore: Johns Hopkins University Press, 1996, 273 pages.
Ben-Ezra et al., "Video Super-resolution Using Controlled Subpixel Detector Shifts," IEEE, Jun. 2005, vol. 27, No. 6, pp. 977-987.
Ben-Ezra et al., "Penrose Pixels for Super-resolution," IEEE, Jul. 2011, vol. 33, No. 7, pp. 1370-1383.
She et al., "Highresolution Imaging via Moving Random Exposure and Its Simulation," IEEE, Jan. 2011, vol. 20, No. 1, pp. 276-282.
Wang et al., "Image Quality Assessment: From Error Visibility to Structural Similarity," IEEE, Apr. 2004, vol. 13, No. 4, pp. 600-612.

* cited by examiner

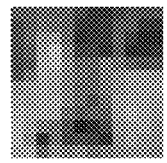 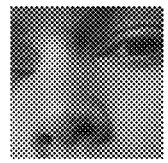
FIG. 7(a)  FIG. 7(b)
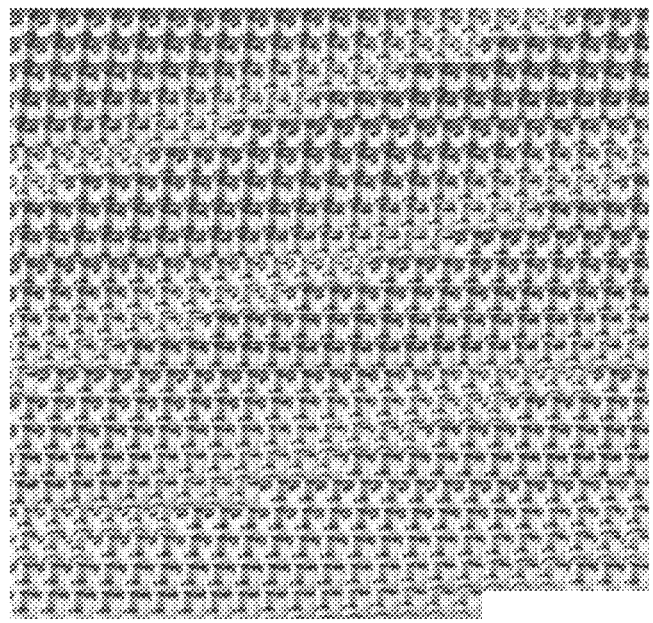
FIG. 9
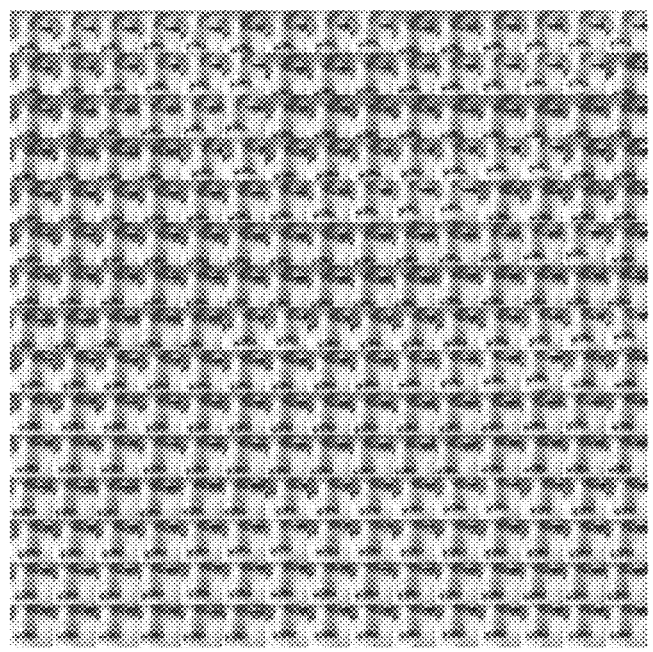
FIG. 10

(a) secondary LR patch (12×12)

(b) 16 DPPCs (each of size 3×3)

(c) local dictionary (20 LR atoms, each of size 15×

(d) 16 estimated PPPCs (each of size 15×15)

(e) estimated HR patch (60×60)

(a) LR patch (6×6)

(b) local dictionary (294 HR atoms, each of size 24×24).

(c) estimated HR patch (24×24).

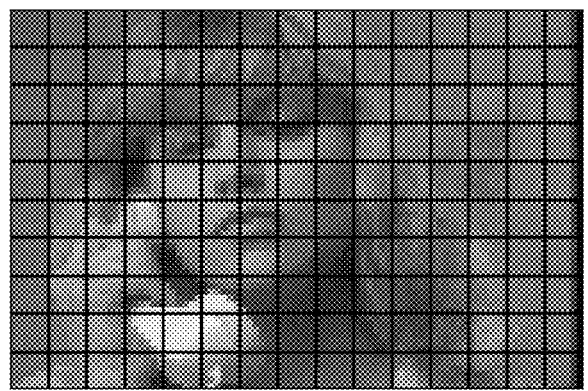
(a) LR patches
FIG. 16
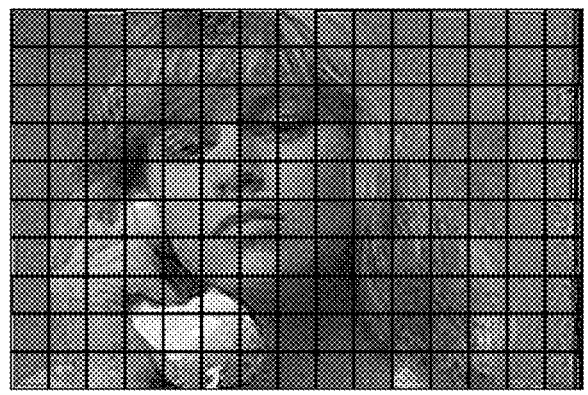
(b) no regularization
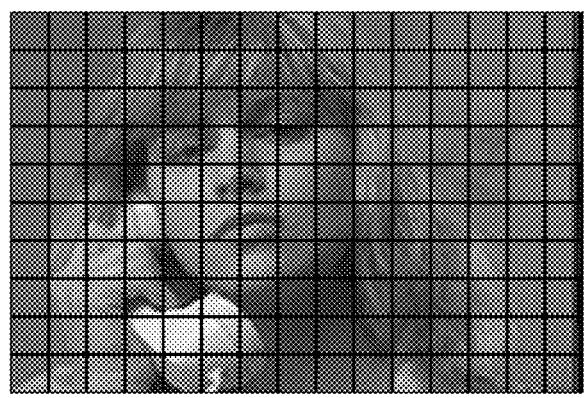
(c) GGM regularization

SUPER-RESOLUTION OF DYNAMIC SCENES USING SAMPLING RATE DIVERSITY

FIELD OF THE INVENTION

The invention relates to super-resolution of dynamic scenes using sampling rate diversity, processes and systems thereof.

BACKGROUND OF THE INVENTION

Super resolution (SR) methods can be classified under two main categories: multiframe super-resolution (MFSR) and single-frame super-resolution (SFSR). MFSR methods estimate a high-resolution (HR) image (or a set of HR images) from a diverse set of low-resolution (LR) images. The nature of such LR diversity is what determines the applicability of any given MFSR method. The reconstruction-based MFSR techniques assume that relative scene motion is what gives rise to LR image diversity.

The most challenging aspect of these classical methods is the necessity of accurate estimation of motion patterns. The majority of such methods restrictively assume that the relative scene motion is translational. Some researchers offer more generalizations by incorporating rotational, affine and projective motion in their model. Recently, C. Liu and D. Sun, "On bayesian adaptive video super resolution," IEEE Transactions on Pattern Analysis and Machine Intelligence, vol. 36, no. 2, pp. 346-360, 2014, proposed an adaptive motion estimation solution with superior performance at an upscaling factor of ×4, but even this advanced reconstruction-based algorithm remains sensitive to non-smooth motion and strong aliasing (aliasing is the main challenge in motion estimation, and it can be severe, even at a relatively high sampling rate, if the underlying signal has significant high frequency content).

To avoid the need for motion estimation altogether, the authors of the MFSR methods of, e.g., M. Protter, M. Elad, H. Takeda, and P. Milanfar, "Generalizing the nonlocal-means to super-resolution reconstruction," IEEE Transactions on Image Processing, vol. 18, no. 1, pp. 36-51, 2009 and H. Takeda, P. Milanfar, M. Protter, and M. Elad, "Super-resolution without explicit subpixel motion estimation," IEEE Transactions on Image Processing, vol. 18, no. 9, pp. 1958-1975, 2009, implement image self-similarity tools, where spatiotemporal similarity between neighboring pixels is relied upon to estimate the missing pixels, with excellent results (up to ×3 upscaling).

When the number of LR images is too low for any multiframe method to work satisfactorily, SFSR becomes the only option. Example-based SFSR has attracted much attention after adopting the signal sparsity paradigm to estimate the HR image from its LR version. In this case, patches of the HR image are estimated by finding their (sparse) representations in terms of a database of example images, with surprisingly good performance (considering only one LR version of the HR image is available).

SUMMARY OF THE INVENTION

In a first aspect of the invention, a method comprises: in a first stage, super-resolving secondary low-resolution (LR) images using a set of primary LR images to create LR dictionaries to represent polyphase components (PPCs) of high resolution (HR) patches of images; and, in a second stage, reverting to a single frame super-resolution (SR) applied to each frame which comprises an entire image, using the HR dictionaries extracted from the super-resolved sequence obtain in the first stage.

In another aspect of the invention, a computer system comprises: a CPU, a computer readable memory and a computer readable storage media; and program instructions: to super-resolve patches of secondary LR frames, in a first stage, into local areas within an entire HR image defined as patches; to create a dictionary to represent PPPCs of the local areas within the entire HR image, in the first stage; and to super-resolve primary LR frames into their HR counterparts, in a second stage, by super-resolving small patches with the secondary LR frames being discarded. The program instructions are stored on the computer readable storage media for execution by the CPU via the computer readable memory.

In yet another aspect of the invention, a computer program product comprises a computer usable storage medium having readable program code embodied in the storage medium. The computer program product includes at least one component operable to: apply SFSR to super-resolve patches of each primary LR frame by representing corresponding HR patches using spatiotemporally local dictionaries, created from $\{\hat{u}_o^k\}$; after computing L number of the HR patches, $\{\hat{u}_\Lambda^{k,l} = \Lambda^{k,l} \hat{x}^{k,l}\}_{l=1}^L$, combine them to obtain an estimated kth HR frame, $\hat{u}_\Lambda^k$; repeat the applying and combining for overlapping HR patches to obtain multiple estimates, $\{\hat{u}_{\Lambda,r}^k\}_{r=1}^R$, of the kth HR frame; and post-process $\{\hat{u}_{\Lambda,r}^k\}_{r=1}^R$ to obtain a final estimate, $\hat{u}_{fin}^k$, of the kth HR frame. The secondary LR images are discarded and super-resolving primary LR frames into their HR counterparts by super-resolving patches comprising the estimated kth HR frames.

BRIEF DESCRIPTION OF THE DRAWINGS

The present invention is described in the detailed description which follows, in reference to the noted plurality of drawings by way of non-limiting examples of exemplary embodiments of the present invention.

Figures 1A, 1B, 1C, 1D, 1E:
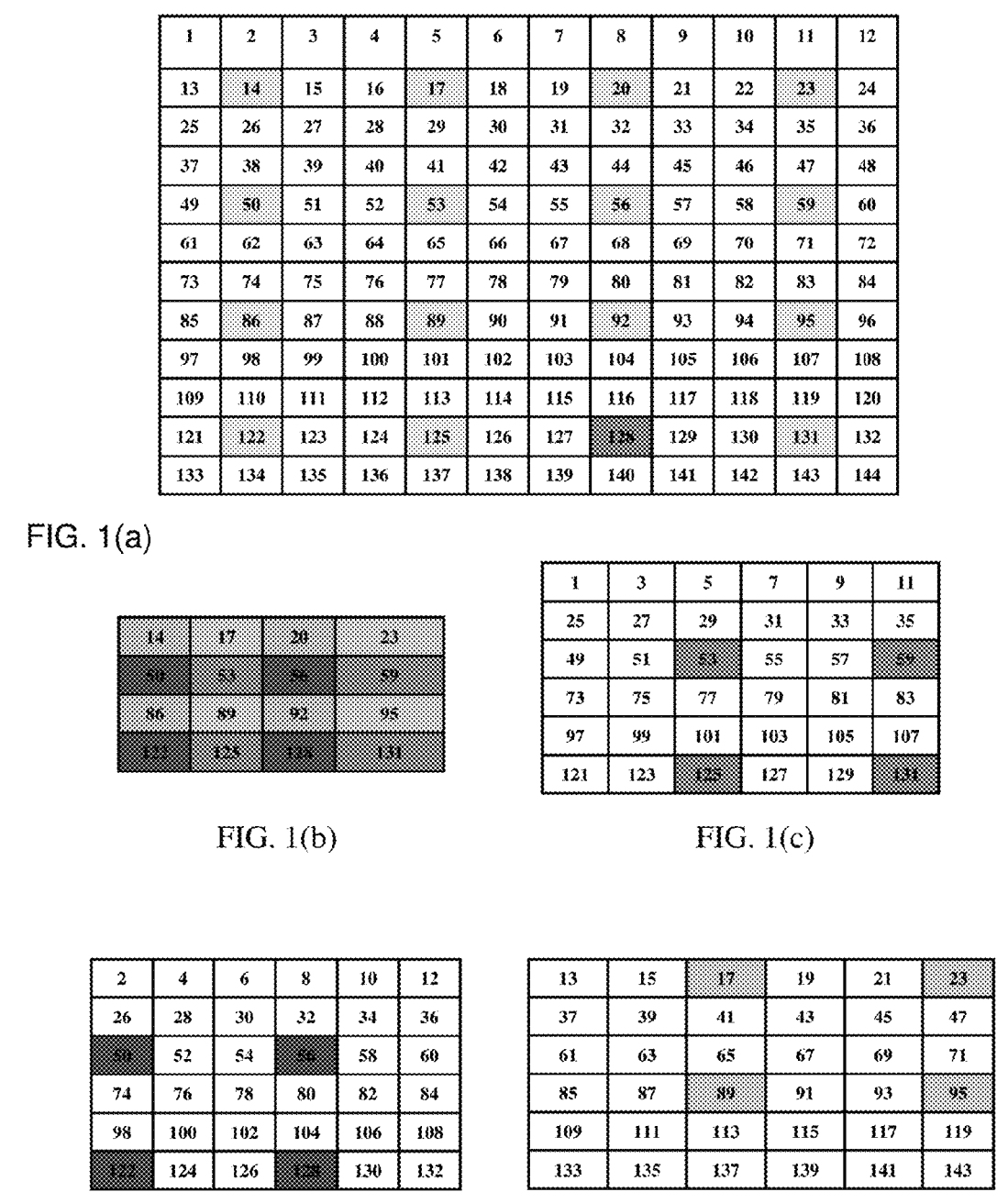

FIGS. 1(a)-1(f) show an illustration of the property of sampling rate diversity.

FIG. 2 shows the results for a "Carphone" test sequence.

FIG. 7(a) shows a secondary (noisy, blurry) 12×12 LR patch.

FIG. 7(b) shows a corresponding ideal (noise-free, blur-free) 60×60 HR patch (J=I+1=5) of FIG. 7(a).

FIG. 9 shows 500 (sample) atoms from a 2904 atom preliminary dictionary (size of each atom is 15×15).

FIG. 10 shows an intermediate dictionary (225 atoms).

FIG. 16 shows the effect of regularization (second stage SR).

DETAILED DESCRIPTION OF THE INVENTION

Figures 1F, 2:
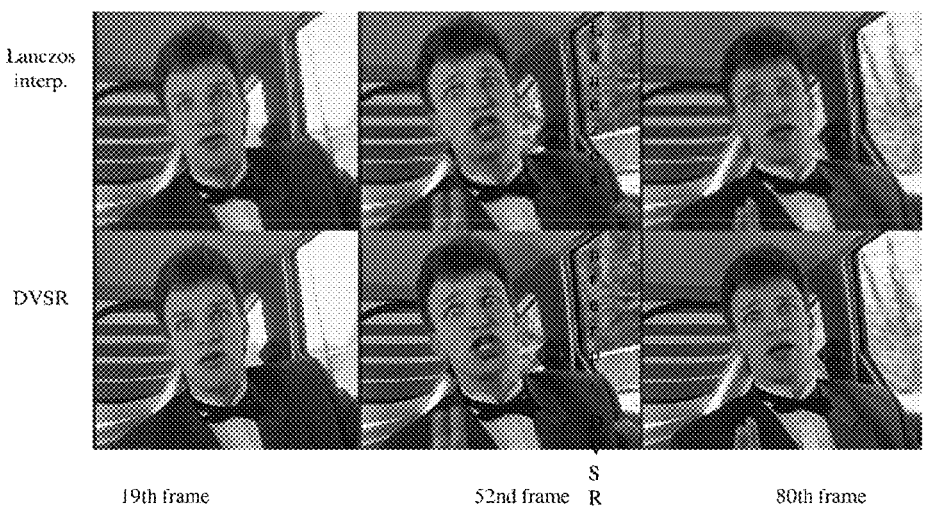

The invention relates to super-resolution of dynamic scenes using sampling rate diversity, processes and systems thereof. More specifically, the present invention is directed to super-resolution as a two-stage example-based algorithm to process dynamic scenes as described herein.

The present invention provides a vast improvement over known processes, e.g., U.S. Pat. No. 8,665,342 which is incorporated by reference in its entirety herein. For example, the present invention opens up the sampling rate diversity idea to more applications by allowing it to handle dynamic (general) videos, compared to handling only super-resolution of videos of static scenes. The processes of the invention go far beyond the restrictive assumption of static scenes; the current invention can handle dynamic scenes (like a talking person, moving cars, etc. For example, in embodiments, the processes associated with sparsity based SR include: (a) work on small areas (patches) of the image; (b) construct a dictionary with as few atoms as possible that are as much correlated with the image wanted to recover as possible; (c) enforce the sparsity prior; and (d) use priors other than sparsity to help stabilize the solution further.

As used herein, a frame is an entire image, while a patch is a local area within this entire image. To this end, frames and patches are images. And, with this noted, the processes of the present invention process local regions (patches) of any given frame, rather than processing the whole frame (the whole image) at once.

More specifically, in embodiments, the super-resolution (SR) employs feature selection to create, from the low-resolution (LR) frames, local LR dictionaries to represent polyphase components (PPCs) of high resolution (HR) patches. To enforce sparsity, the present invention implements Gaussian generative models as an efficient alternative to L1-norm minimization. Estimation errors are further reduced using 'anchors', which are based on the relationship between PPCs corresponding to different sampling rates. In the second stage of the algorithm, the algorithm reverts to a simple single frame SR (applied to each frame), using HR dictionaries extracted from the super-resolved sequence of the previous stage. The second stage is thus only a reiteration of the sparsity coding scheme, using only one LR sequence, and without involving PPCs. The ability of the modified algorithm to super-resolve challenging LR sequences reintroduces sampling rate diversity as a prerequisite of robust multiframe SR.

To further elaborate, the DVSR algorithm (processes) of the present invention comprises two stages. In the first stage, LR images, captured by the first (primary) sensor, are used to collect local databases of highly relevant example LR image patches to represent PPCs of patches of a HR frame, corresponding to patches of the current (reference) secondary LR frame (captured by the secondary sensor). For dimensionality reduction, feature selection is used to create very small LR dictionaries, and (sparse) representations of the PPCs (per patch) are then sought after by solving a penalized least squares problem.

Regularization is partially based on a Gaussian generative model (GGM), with mean and covariance matrix that are estimated from the (local) dictionary atoms. The solution is further enhanced by enforcing joint estimation of the representations of the PPCs (per patch), using what is referred to as the 'anchors', which are based on the relationship between PPCs corresponding to different sampling rates. Multiple estimates of a HR frame can be computed by super-resolving overlapping patches, and a final (first stage) estimate is then obtained by jointly post-processing all estimates. In the second stage, processes simply reiterate the example-based sparsity coding idea, but without dealing with PPCs. At this stage, the secondary LR mages do not play any role, and the primary LR frames are used as reference images to be super-resolved via SFSR (applied per frame), where local (HR) dictionaries are extracted from the super-resolved sequence of the first stage to represent HR patches of each frame.

It should be noted in the context of the present invention, in MFSR work of the inventors, it has been proposed adding a secondary (lower resolution) sensor, leading to sampling rate diversity, with twofold consequences. First, the reconstruction-based approach to SR is entirely abandoned by reformulating the SR problem as a signal representation problem precluding the need to estimate and reverse the processes that give rise to the diversity of the LR images. Second, and more importantly, the limits on LR diversity are pushed further by regarding as useful any LR image that correspond to (global or local) linear space-invariant (LSI) transforms. This makes the proposed SR setup applicable in certain complex imaging conditions, where, for instance, the idea of harnessing detail from distortions can materialize in situations that require imaging through the turbulent atmosphere. A general sequence of LR images, however, need not correspond to linear transformations. In particular, a video of a dynamic scene, where objects in the scene evolve and change with time cannot be handled by previous algorithms or processes. The objective and advantages of the present invention are to extend the ability of sampling rate diversity to address dynamic video super-resolution (DVSR) by drawing upon lessons learned from example-based SFSR.

MFSR Using a Bi-Sensor Camera

By way of background, suppose a sensor with the smallest possible pixels is provided, each with pixel size $P_v \times P_h$, but what is needed are images with higher resolution, by a factor of I, in both directions. According to F. Salem and A. E. Yagle, "Non-parametric super-resolution using a bi-sensor camera," IEEE Transactions on Multimedia, vol. 15, no. 1, pp. 27-40, 2013 (the contents of which are incorporated by reference in their entirety herein, if (another) secondary sensor is built with a different (larger) pixel size of $J/I\, P_v \times J/I\, P_h$, where $J=I+1$, and a beam splitter is used to divert half of the light to it, while capturing multiple images of a scene, then it is possible to obtain super-resolved images with $I^2$ more pixels than what was captured by the first (higher resolution) primary sensor. This framework for super-resolution is based on the relationship between PPCs of an image corresponding to different decimation factors. The following is an illustration of this relationship, which is referred to as the property of sampling rate diversity.

Let u be an image of size 12×12, with pixel values as shown in FIG. 1(*a*).

Let $\tilde{\upsilon}_{m^*}$ (FIG. 1(b)) denote the image containing all the highlighted pixels in FIG. 1(a), which is the 5th PPC corresponding to decimation factor J=3.

FIGS. 1(c)-(f) show the 4 PPCs corresponding to decimating u by I=2. Henceforth, a PPC corresponds to ↓J as a secondary PPC (SPPC), whereas, a primary PPC (PPPC) corresponds to ↓J, where J=I+1. Because I and J are two consecutive integers, any SPPC shares with any PPPC, $1/I^2J^2$ of the original image pixels, which are the highlighted pixels in FIG. 1(c)-(f), in this example.

When the HR image u is unknown, and all that is known is one of its SPPCs, a reference SPPC (RSPPC), then a decimated version of each PPPC is already known, which can be taken advantage of within a bi-sensor setup. For example, the primary sensor is assigned the job of generating a basis of LR images to represent the PPPCs of the HR image that corresponds to the LR image captured by the secondary sensor, whose job is to provide the decimated versions of these PPPCs. Put differently, since both the primary and the secondary sensors are looking at the same scene, while capturing multiple frames of it, then it is possible to estimate multiple HR frames using each image captured by the secondary sensor as a RSPPC, to provide the decimated versions of the PPPCs of each corresponding HR frame. These partial measurements are used to find representations of each PPPC in terms of the LR basis captured by the primary sensor. Ultimately, therefore, super-resolve the secondary sequence of LR images is sought; the primary LR images are only there to provide a representative basis.

In F. Salem and A. E. Yagle, "Non-parametric super-resolution using a bi-sensor camera," it is explained that a very small number of diverse primary LR images (in the order of $I^2$ images) can fully represent the PPPCs if the scene is static and the LR image diversity is attributed to global (or even local) LSI transformations. For example, using the proposed bi-sensor camera to shoot, in video mode, a static scene through the turbulent atmosphere, would produce two videos from which a super-resolved video of the atmospherically distorted scene can be computed.

In what follows, a brief review how each HR frame is estimated is explained.

Let $u^k \in R^{L\sqrt{P} \times L\sqrt{P}}$ denote the kth HR frame corresponding to the kth LR frame, $\tilde{y}^k \in R^{\sqrt{P} \times \sqrt{P}}$, captured by the secondary sensor, and let $\upsilon_n^k \in R^{J\sqrt{P} \times J\sqrt{P}}$ and $\tilde{\upsilon}_m^k \in R^{I\sqrt{P} \times I\sqrt{P}}$ denote the nth PPPC and the mth SPPC of the kth HR frame, respectively, then, owing to the property of sampling rate diversity (illustrated in FIGS. 1(a)-(f)), for all n and m, there exists a decimated PPC (DPPC), $\upsilon_{n,j}^k \in R^{\sqrt{P} \times \sqrt{P}}$, obtained by decimating $\upsilon_n^k$ by J, that coincides with a DPPC, $\tilde{\upsilon}_{m,i}^k \in R^{\sqrt{P} \times \sqrt{P}}$, corresponding to decimating $\tilde{\upsilon}_m^k$ by I, for j=τ(m,n) and i=ρ(m,n), where τ(•) and ρ(•), are 1-1 mapping functions identifying the DPPC common to the nth PPPC and the mth SPPC, respectively. Therefore, if $\tilde{y}^k$ is assigned the role of the RSPPC, $\tilde{\upsilon}_{m^*}^k$, $$D_j^J \underline{\upsilon}_n^k = \underline{\upsilon}_{n,j}^k = \underline{\tilde{\upsilon}}_{m^*,i}^k = D_i^I \underline{\tilde{\upsilon}}_{m^*}^k = D_i^I \underline{\tilde{y}}^k \text{ for } n=1, \ldots, J^2, \quad (1)$$
$$i=\rho(m^*,n) \text{ and } j=\tau(m^*,n),$$

where $D_j^J$ is the shifting and ↓J decimating matrix that gives the jth DPPC of the nth PPPC. Similarly, $D_i^I$ is the shifting and ↓I matrix that extracts the ith DPPC from the RSPPC. Underlined symbols denote (column) vectors. Also, if s is a two-dimensional (2D) signal, its vector form, $\underline{s}$, is obtained by lexicographically reordering the elements of s. It is also noted that since the kth HR frame can be decomposed into $J^2$ SPPCs, $\{\tilde{\upsilon}_m^k\}_{m=1}^{J^2}$, there is a degree of freedom in choosing which SPPC would play the role of the RSPPC. Choosing the middle SPPC, i.e. m=m*=[$J^2$/2], as reference generally gives favorable results.

Now, let Y be the matrix containing, as its columns, diverse primary frames that satisfy the (restrictive) condition of linearity, then Y can be used to represent the PPPCs, i.e., $$\underline{\upsilon}_n^k = Y \underline{x}_n^k \text{ for } n=1, \ldots, J^2, \quad (2)$$

where $\underline{x}_n^k$ is the representation of $\underline{\upsilon}_n^k$ in terms of Y. Combining equations (1) and (2), it is now possible using the processes of the invention to obtain an estimate, $\underline{\hat{x}}_n^k$, by solving:

$$\min_{\underline{x}_n^k} \|D_j^J Y \underline{x}_n^k - D_i^I \underline{\tilde{y}}^k\|_2^2 \text{ for } n = 1, \ldots, I^2, \quad (3)$$

$$i = \rho(m^*, n) \text{ and } j = \tau(m^*, n).$$

An estimate of the kth HR frame is then obtained by simply interlacing estimates of its PPPCs, $\{\underline{\hat{\upsilon}}_n^k = Y \underline{\hat{x}}_n^k\}$. Note that because any image captured by a camera would be noisy and blurred (at least because of camera blur), the kth HR frame, $u^k$, what is set out to estimate, is the distorted (blurry and noisy) version of the original (static) HR scene, $u_o$ (the reference image, $\tilde{y}^k$, is viewed as a decimated version of $u^k$). Therefore, post-processing, that includes sharpening, is a required step.

Sparsity Coding for SFSR

SFSR attempts to carry out the monumental task of estimating the original HR image, $\underline{u}_o$, from a single LR version of it, $\underline{y}$. This severely underdetermined problem calls for using a priori known information on the HR image. One such image prior is the sparsity of the HR image representation, $\underline{x}$, in terms of some dictionary (basis). To benefit from such a prior, the original problem needs to be reformulated as a sparsity coding problem (i.e., solving for $\underline{x}$ rather than solving for $\underline{u}_o$ directly). Also, for lower complexity, the HR image is divided into smaller L patches, $\{\underline{u}_o^l\}_{l=1}^L$, corresponding to L patches of the LR image, $\{\underline{y}^l\}_{l=1}^L$.

The most straightforward formulation of the sparsity coding problem thus involves estimating a set of representations, $\{\underline{x}^l\}$, of $\{\underline{u}_o^l\}$ in terms of a (sparsifying) dictionary by solving:

$$\min_{\underline{x}^l} \{\|DH_{cam} B \underline{x}^l - \underline{y}^l\|_2^2 + \lambda_1 \|\underline{x}^l\|_1\} \text{ for } l = 1, \ldots, L, \quad (4)$$

where D is the decimation matrix, with decimation factor I, $H_{cam}$ represents the camera blur (due to optics and sensor blur), $\lambda_1$ is the sparsity regularization constant, and B is a dictionary, derived from a (huge) database of example HR image patches extracted from generic high quality images. See, e.g., W. Dong, L. Zhang, G. Shi, and X. Wu, "Image deblurring and superresolution by adaptive sparse domain selection and adaptive regularization," IEEE Transactions on Image Processing, vol. 20, no. 7, pp. 1838-1857, 2011; W. Dong, L. Zhang, R. Lukac, and G. Shi, "Sparse representation based image interpolation with nonlocal autoregressive modeling," IEEE Transactions on Image Processing, vol. 22, no. 4, pp. 1382-1394, 2013.

According to compressive sensing (CS) theory, if a signal is sparse in some basis, and a few samples of it are acquired via random projections, then they can be enough for accurate recovery of the signal, in its entirety, under certain conditions. See, e.g., E. J. Candes and M. B. Wakin, "An introduction to compressive sampling: A sensing/sampling paradigm that goes against the common knowledge in data acquisition," IEEE Signal Processing Magazine, vol. 25, no. 2, pp. 21-30, 2008. In the matter of SFSR, however, the available measurements (the pixels of the LR image), are acquired by uniform sampling of the HR image, and, therefore, the theoretical recovery guarantees of CS do not necessarily apply, yet it has been empirically proven that recasting SFSR as a CS problem (4) can give good results, even at ×3 upscaling, depending in large part on the (sparsifying) dictionary. See, e.g., W. Dong, et al, and L. Zhang, G. Shi, and X. Wu, "Image deblurring and superresolution by adaptive sparse domain selection and adaptive regularization," IEEE Transactions on Image Processing, vol. 20, no. 7, pp. 1838-1857, 2011; W. Dong, L. Zhang, R. Lukac, and G. Shi, "Sparse representation based image interpolation with nonlocal autoregressive modeling," IEEE Transactions on Image Processing, vol. 22, no. 4, pp. 1382-1394, 2013.

Successful recovery of the HR image heavily depends on the dictionaries. In particular, the choice (or the design) of the dictionary must be made with utmost care such that it contains the smallest possible total number of dictionary atoms (the smallest possible dictionary is desired). This, by itself, makes sparsity coding problem less underdetermined (since there would be fewer unknowns to solve for). Furthermore, the dictionary must be created such that only a few atoms correspond to significant representation weights, i.e. most elements of $\underline{x}^l$ should be zero (or near zero), thus augmenting the worth of the sparsity penalty term.

A dictionary can be made smaller via feature extraction (dictionary training or learning), or feature selection (also known as subspace selection) (see, e.g., I. Tosic and P. Frossard, "Dictionary learning," IEEE Signal Processing Magazine, vol. 28, no. 2, pp. 27-38, 2011.), or a combination of both. In the context of sparsity coding, where an image patch is assumed to belong to the same class of example image patches, feature extraction is expected to allow the example images, in the untrained dictionary, to be sparsely represented by a smaller trained dictionary, which is a process known as sparsity coding dictionary training.

In W. Dong, L. Zhang, G. Shi, and X. Wu, "Image deblurring and superresolution by adaptive sparse domain selection and adaptive regularization," IEEE Transactions on Image Processing, vol. 20, no. 7, pp. 1838-1857, 2011, the authors make improvements essentially by employing k-means clustering (based on high frequency components) for dictionary dimensionality reduction, followed by simple principal component analysis (PCA) training, thus creating local, small, and more relevant sub dictionaries to represent image patches. Another important contribution is the (additional) use of self-similarity priors for a more stable solution.

Nevertheless, K. Zhang, X. Gao, D. Tao, and X. Li, "Single image super-resolution with non-local means and steering kernel regression," IEEE Transactions on Image Processing, vol. 21, no. 11, pp. 4544-4556, 2012 show that solely relying on self-similarity priors (entirely giving up on sparsity coding) gives superior SFSR performance compared to solutions based on dictionaries trained from generic databases of example images. In plain terms, the results can be used as evidence of the shortcomings of the sparsity prior when the database of images is generic. In certain applications, however, it is possible to create special dictionaries that are more amenable to dimensionality reduction (and more sparsifying) for enhanced recovery of the HR image.

For instance, dictionaries generated from a database of faces are more helpful in recovering HR facial images J. Yang, J. Wright, T. S. Huang, and Y. Ma, "Image super-resolution via sparse representation," IEEE Transactions on Image Processing, vol. 19, no. 11, pp. 2861-2873, 2010. In D. Trinh, M. Luong, F. Dibos, J. Rocchisani, C. Pham, and T. Q. Nguyen, "Novel example-based method for super-resolution and denoising of medical images," IEEE Transactions on Image Processing, vol. 23, no. 4, pp. 1882-1895, 2014, the authors use high quality medical image databases for medical image SR. Naturally, special databases are not useful in super-resolving generic images, but the present invention devises a method whereby, for any arbitrary image that will be super-resolved, it can now be possible to collect, in an unsupervised fashion, a database of highly relevant example images. Such a method is very ideal for example-based SR, and, in essence, which can be used to emulating this ideal situation.

Bi-Sensor-Based MFSR Vs. SFSR

Similar to equation (4), the MFSR method is also a signal representation based solution (3). In both cases, a signal representation is sought in terms of a dictionary using partial data, and the difference lies in:

(i) the signals wanting to represent, i.e. PPPCs, $\{\underline{u}_n\}_{n=1}^{I^2}$, of a HR image (the superscript, k, is omitted in this comparison, for clarity of presentation.), $\underline{u}$, vs. HR patches, $\{\underline{u}_o^l\}_{l=1}^{L}$, (ii) the partial data used, $\{D_i^l \hat{\underline{y}}\}_{i=1}^{I^2}$ vs. $\{\underline{y}^l\}_{i=1}^{L}$, and (iii) the size (number of atoms) and relevance of the dictionary, where Y is generated by the primary LR sensor, while B is derived from a set of generic HR images.

These differences make problem (3) highly overdetermined and thus no special image priors, like the sparsity prior, are needed. In particular, the bi-sensor setup derives its strength from the fact that only $I^2$ highly correlated signals, i.e. the PPPC, $\{\underline{u}_n\}_{n=1}^{I^2}$, need to be estimated and thus they belong to a subspace of much smaller dimensionality. This, coupled with the fact that in certain applications, LR images of a static scene can be viewed as linear mixtures of the scene's PPCs, makes the (very small) basis, Y, an excellent candidate to represent them.

But the questions that need to be asked include:

(i) What happens when the scene is not static?

(ii) What if the scene evolves, albeit slowly, across the captured frames?

(iii) Would a dictionary, with primary LR frames of a dynamic scene as its atoms, efficiently represent the PPPCs of the current HR frame being sought to estimate?

Unfortunately, applying previous solutions so super-resolve a dynamic sequence of images gives results not far from bi-cubic interpolation. Based on intuition gained from SFSR, the dynamic LR frames can at least be viewed as excellent, highly representative example images for the PPPCs of each frame can be candidates for estimate. Recall, nonetheless, that an estimate of a HR image is obtained by interlacing its estimated $I^2$ PPPCs, and in light of the fact that the PPCs of a signal are highly correlated with only subtly distinctive details, it becomes evident that, unless the representations are fairly accurate, the reconstructed versions would look too similar to the point that, after interlacing them, the SR image appears like an interpolated image.

DVSR Stage I: Example-Based MFSR

Image Patches and Gaussian Generative Models

Borrowing insight from the field of SFSR, the present invention provides significant improvements over previous solutions to the level of an example-based MFSR algorithm as noted herein. For example, instead of estimating the representations of the PPPCs of the entire kth HR frame, divide it into L patches, $\{u^{k,l}\}_{l=1}^{L} \in R^{I\sqrt{p} \times I\sqrt{p}}$ corresponding to L patches of the current (kth) secondary LR image used as reference, $\{\tilde{y}^{k,l}\}_{l=1}^{L} \in R^{\sqrt{p} \times \sqrt{p}}$ and the systems and processes of the present invention estimate the representations of the PPPCs of the lth patch in the kth HR frame, $\{\upsilon_n^{k,l}\}_{n=1}^{I^2} \in R^{\sqrt{p} \times \sqrt{p}}$, by solving $$\min_{\underline{x}_n^{k,l}} \|D_j^J \Psi^{k,l} \underline{x}_n^{k,l} - D_i^I \underline{\tilde{y}}^{k,l}\|_2^2 \text{ for} \quad (5)$$

$$n = 1, \ldots, I^2, i = \rho(m^*, n) \text{ and}$$

$$j = \tau(m^*, n),$$

where $\Psi^{k,l} \in R^{pJ^2 \times N}$ is a local dictionary with atoms extracted from the primary LR images (see below) to represent the PPPCs of the lth patch in the kth frame, i.e., $\hat{\underline{\upsilon}}_n^{k,l} = \Psi^{k,l} \hat{\underline{x}}_n^{k,l}$ for $n=1, \ldots, I^2$. Although, thus far, $\{\hat{\underline{x}}_n^{k,l}\}_{n=1}^{I^2}$ are estimated independently from each other, it is more convenient to rewrite (5) as $$\min_{\{\underline{x}_n^{k,l}\}_n} \sum_{n=1}^{I^2} \|D_{m^*,n}^J \Psi^{k,l} \underline{x}_n^{k,l} - D_{m^*,n}^I \underline{\tilde{y}}^{k,l}\|_2^2, \quad (6)$$

where $D_{m,r}^J \triangleq D_{j=\tau(m,n)}^J$ and $D_{m,n}^I \triangleq D_{i=\rho(m,n)}^I$.

The patch size is chosen based on a compromise between number of measurements and ease of modeling (see, e.g., M. Elad, M. A. T. Figueiredo, and Y. Ma, "On the role of sparse and redundant representations in image processing," Proceedings of the IEEE, vol. 98, no. 6, pp. 972-982, 2010; G. Yu, G. Sapiro, and S. Mallat, "Solving inverse problems with piecewise linear estimators: From Gaussian mixture models to structured sparsity," IEEE Transactions on Image Processing, vol. 21, no. 5, pp. 2481-2499, 2012, the contents of which are incorporated herein in their entireties.

Specifically, a large patch means more measurements (larger $D_i^I \underline{\tilde{y}}^{k,l} \in R^p$), but the smaller $\underline{u}^{k,l} \in R^{pJ^2}$, and thus smaller PPPCs, $\{\underline{\upsilon}_n^{k,l}\}_{n=1}^{I^2} \in R^{pJ^2}$, the easier it is to create a smaller (small N), more representative dictionary, $\Psi^{k,l}$. Depending on the patch size and the dimensionality of $\Psi_{k,l}$, equation (6) can be underdetermined when N>p, and thus a minimization of the L1-norm of the representations would be helpful, $$\min_{\{\underline{x}_n^{k,l}\}} \sum_{n=1}^{I^2} \left[ \|D_{m^*,n}^J \Psi^{k,l} \underline{x}_n^{k,l} - D_{m^*,n}^I \underline{\tilde{y}}^{k,l}\|_2^2 + \lambda_1 \|\underline{x}_n^{k,l}\|_1 \right]. \quad (7)$$

If it is assumed the signal wanting to represent is drawn from a Gaussian generative model, with mean and covariance that are estimated using the dictionary based atoms as instances of this generative model, then finding a representation that maximizes the posterior distribution (assuming Gaussian noise) can be interpreted as solving a sparsity coding problem, if the number of dictionary atoms is not larger than their dimensionality. (G. Yu, G. Sapiro, and S. Mallat, "Solving inverse problems with piecewise linear estimators: From Gaussian mixture models to structured sparsity," IEEE Transactions on Image Processing, vol. 21, no. 5, pp. 2481-2499, 2012.) Therefore, if $N \leq pJ^2$ ($\Psi^{k,l}$ is compact) and if one is to assume that a PPPC has a multivariate Gaussian distribution, i.e., $\underline{\upsilon}_n^{k,l} \sim N(\underline{\mu}^{k,l}, C^{k,l})$, with $$\underline{\mu}^{k,l} = \frac{1}{N} \Psi^{k,l} \underline{1}_N,$$

$$\text{and } C^{k,l} = \frac{1}{N} (\Psi^{k,l} - \underline{\mu}^{k,l} \underline{1}_N^T)(\Psi^{k,l} - \underline{\mu}^{k,l} \underline{1}_N^T)^T + \varepsilon I_{pJ^2},$$

where $\underline{1}_N$ is an N-dimensional vector with all its elements equal to one, $\varepsilon$ is a small number, and $I_{pJ^2}$ is the identity matrix with dimension $pJ^2$, then instead of solving equation (7) it is possible to solve, with implementation of the processes of the invention;

$$\min_{\{\underline{x}_n^{k,l}\}} \sum_{n=1}^{I^2} \left[ \|D_{m^*,n}^J \Psi^{k,l} \underline{x}_n^{k,l} - D_{m^*,n}^I \underline{\tilde{y}}^{k,l}\|_2^2 + \lambda^2 \zeta(\underline{x}_n^{k,l}) \right], \quad (8)$$

where $\zeta(\underline{x}_n^{k,l}) = (\Psi^{k,l} \underline{x}_n^{k,l} - \underline{\mu}^{k,l})^T (C^{k,l})^{-1} (\Psi_{k,l} \underline{x}_n^{k,l} - \underline{\mu}_{k,l}) = \|(C^{k,l})^{-1/2} \Psi^{k,l} \underline{x}_n^{k,l} - (C^{k,l})^{-1/2} \underline{\mu}^{k,l}\|_2^2$, Again, recall that this option of linear vs. nonlinear (7) estimation of sparse representations is only possible if the dictionary is compact.

Basis Harvesting and Selection

The goal of solving equation (8) is to super-resolve $\hat{y}^{k,l}$ into $\underline{u}^{k,l}$ by representing the PPPCs of the HR patch, $\underline{u}^{k,l}$, in terms of a dictionary, $\Psi^{k,l}$, extracted from the primary LR frames. In this subsection, a procedure is described to create a small, highly representative dictionary, to counteract the fact that the processes only have partial measurements (DPPCs) to compute the representations $\{\underline{x}_n^{k,l}\}_n$.

A preliminary dictionary can be harvested from the primary LR images based on spatiotemporal similarity between patches. Specifically, first select K primary LR images, $\{\underline{y}^K\}_{K=-0.5K+k}^{0.5K+k-1}$ that are nearest (in time) to the current (kth) HR image wanting to estimate. Spatially overlapping patches are then extracted from each one of these selected frames as follows:

$$\underline{y}_{d_1,d_2}^{K,l} = R^l S_{d_1,d_2} \underline{y}^K, \quad (9)$$

for $-0.5K+k \leq K \leq 0.5K+k-1$, $-d \leq d_1, d_2 \leq d$, where K and d are user-defined parameters, $S_{d_1,d_2}$ represents the shifting operator that shifts by $d_1$ and $d_2$ pixels in the horizontal and the vertical direction, respectively, and $R^l$ extracts the lth patch of the shifted frame. The set $\{\underline{y}_{d_1,d_2}^{K,l}\}_{K,d_1,d_2}$ thus contains $K(2d+1)^2$ example LR image patches with HR counterparts that have high similarity with $\underline{u}^{k,l}$, and are thus expected to be of significant relevance to the representation of the PPPCs, $$\{\underline{\upsilon}_n^{k,l}\}_n \in R^{pJ^2}$$

Therefore, these example LR patches can serve as atoms in a spatiotemporally local dictionary, $\Psi_{prelim}^{k,l} \in R^{pJ^2 \times K(2d+1)^2}$.

Because of the high correlation among the PPPCs, they belong to a very narrow region of the subspace spanned by the harvested example LR images from equation (9), which is a fact capitalized on by interpolating the RSPPC, $\tilde{y}^{k,l} \in R^J \sqrt{p} \times \sqrt{p}$, into $\tilde{y}_{interp}^{k,l} \in R^{J\sqrt{p} \times J\sqrt{p}}$ to serve as a training sample (a representative sample of a PPPC), for selecting the best $\kappa \ll K(2d+1)^2$ atoms. An ostensibly ideal selection scheme would involve solving:

$$\min_{\underline{x}} \left\| \Psi_{prelim}^{k,l} \underline{x} - \tilde{\underline{y}}_{interp}^{k,l} \right\|_2^2 \text{ s.t. } \|x\|_0 \leq \kappa, . \quad (10)$$

Then select dictionary atoms that correspond to nonzero weights. Nevertheless, even if equation (10) could be solved exactly, there is a potential problem of overfitting, namely, a selected K-atom dictionary that best fits $\tilde{\underline{y}}_{interp}^{k,l}$, is not necessarily the best fit for all $\{\underline{u}_n^{k,l}\}_n$, because, despite the high correlation, it is the faint discriminative details distinguishing PPPCs from each other that the dictionary would be able to capture as well as the dominant component shared between all PPPCs. For example, if $\underline{u}_n^{k,l} = \underline{v}^{k,l} + \underline{\delta}_n^{k,l}$, where $\underline{v}^{k,l}$ is the dominant component common to all PPPCs, and $\underline{\delta}_n^{k,l}$ represents the distinctive components of the nth PPPC, then a dictionary that best fits $\tilde{\underline{y}}_{interp}^{k,l}$, might capture $\underline{v}^{k,l}$ well, but not necessarily $\underline{\delta}_n^{k,l}$.

An extreme alternative to solving equation (10) is adopting the very simple best individual feature (BIF) selection method, where atoms with the highest relevance, as measured (for example) by the absolute correlation coefficient (ACC), are selected individually. Using BIF selection, there could be a high degree of redundancy in the K-selected features (atoms), which would result in a much localized representation power, but it might still generalize better to the (highly correlated) PPCs which are to be represented. Therefore, in the context of our work, what is needed is a balance between relevance and redundancy, a feature selection approach that avoids overfitting to $\tilde{\underline{y}}_{interp}^{k,l}$, while minimizing redundancy among selected atoms, but only to within the high correlation level among the (unknown) PPPCs sought to be represented. One scheme that proved its efficacy in the experiments presented herein is a combination of BIF selection and (a variant of) the minimal-redundancy-maximal-relevance (mRMR) method described in H. Peng, F. Long, and C. Ding, "Feature selection based on mutual information: Criteria of max-dependency, max-relevance, and minredundancy," IEEE Transactions on Pattern Analysis and Machine Intelligence, vol. 27, no. 8, pp. 1226-1238, 2005.

The mRMR method attempts to maximize relevance while minimizing redundancy among selected features. The processes and systems have modified the Matlab code, provided by the H. Peng, F. Long, and C. Ding, "Feature selection based on mutual information: Criteria of max-dependency, max-relevance, and minredundancy," IEEE Transactions on Pattern Analysis and Machine Intelligence, vol. 27, no. 8, pp. 1226-1238, 2005, by adopting the simple scale-invariant ACC (instead of mutual information) as the measure of relevance (and interdependencies between selected features). The (ACC-based) algorithm relies on sequential search for best features by incrementally optimizing the following condition, to choose the ith (current) best feature:

$$\max_{\underline{f_i} \in \{C-S\}} \left[ r(\underline{f_i}, \underline{c}) - \frac{1}{|S|} \sum_{\underline{f_j} \in S} r(\underline{f_i}, \underline{f_j}) \right],$$

where $$r(\underline{f_i}, \underline{f_j}) = \frac{|f_i^T f_j|}{\|f_i\| \|f_j\|}$$

is the (absolute) correlation coefficient between two vectors, $\underline{f_i}$ and $\underline{f_j}$, C is the entire set of features (e.g., the input dictionary), $\underline{c}$ is the feature vector ($\tilde{\underline{y}}_{interp}^{k,l}$, in our case), S is the updated set of selected features, and |S| denotes the number of elements in S.

Despite the success of the mRMR method, given the uniqueness of the present situation (where atoms are selected to represent highly correlated PPCs), the dictionary creation process do not overemphasize the redundancy minimization part. That is, mRMR offers much better generalization 'at the expense' of redundancy (a potential compromise, given the nature of PPCs). For this reason, the systems and processes of the present invention include atoms selected by BIF as described herein.

Although the mRMR method is pretty fast, it still is more complex than simple BIF selection. Therefore, in the interest of lowering complexity, it is preselected, out of the harvested $K(2d=1)^2$ patches, only $pJ^2$ patches using BIF selection, producing the intermediate dictionary, $\Psi_{interm}^{k,l} \in R^{pJ^2 \times pJ^2}$, then the processes apply the mRMR method to $\Psi_{interm}^{k,l}$ to choose the best $\kappa$ patches, and obtain $\Psi_{mRMR}^{k,l} \in R^{pJ^2 \times \kappa}$. The systems and processes also apply BIF selection (again) to $\Psi_{interm}^{k,l}$ to choose the best $\kappa$ patches, and obtain $\Psi_{BIF}^{k,l} \in R^{pJ^2 \times \kappa}$. The final dictionary, $\Psi^{k,l}$, contains the 'unique' atoms of the union of atoms of $\Psi_{mRMR}^{k,l}$ and $\Psi_{BIF}^{k,l}$, and thus $\Psi^{k,l} \in R^{pJ^2 \times N}$, with $\kappa \leq N \leq 2\kappa$.

Let BIF (C, $\underline{c}$, $\kappa$) and M R M R (C, $\underline{c}$, $\kappa$) denote BIF and mRMR selection processes, respectively, of best $\kappa$ features in C, based on feature vector $\underline{c}$, using ACC as a measure of relevance, and let $\Delta$ denote the symmetric difference between two sets, then our dictionary creation process (per lth patch in the kth frame) can be summarized as follows:

(1) $\Psi_{prelim}^{k,l} = \{\underline{y}_{d_1,d_2}^{K,l}\}_{K,d_1,d_2}$; 
(2) Get $\tilde{\underline{y}}_{interp}^{k,l} \in R^{pJ^2}$ from $\underline{\tilde{y}}^{k,l} \in R^{pJ^2}$ (using, e.g., Lanczos interpolation).
(3) $\Psi_{interm}^{k,l} = \text{BIF}(\Psi_{prelim}^{k,l}, \tilde{\underline{y}}_{interp}^{k,l}, pJ^2)$.
(4) $\Psi_{mRMR}^{k,l} = \text{M R M R}(\Psi_{interm}^{k,l}, \tilde{\underline{y}}_{interp}^{k,l}, \kappa)$.
(5) $\Psi_{BIF}^{k,l} = \text{BIF}(\Psi_{interm}^{k,l}, \tilde{\underline{y}}_{interp}^{k,l}, \kappa)$.
(6) $\Psi^{k,l} = (\Psi_{BIF}^{k,l} \Delta \Psi_{mRMR}^{k,l}) + (\Psi_{BIF}^{k,l} \cap \Psi_{mRMR}^{k,l})$ Anchor SPPCS In problems, such as SR, where measurements are only partially available, penalty terms, based on image priors, are employed to make up for measurement incompleteness. Although well-known penalty terms enforcing, for instance, (HR) image smoothness do not apply to (low resolution) PPCs, they can still be implemented in our case, because a HR image (patch) can be written as the sum of shifted up-sampled versions of its PPCs, i.e.

$$\underline{u}^{k,l} = \sum_{n=1}^{J^2} S_n Z^l \underline{v}_n^{k,l} = \sum_{n=1}^{J^2} S_n Z^l \Psi^{k,l} \underline{x}_n^{k,l}$$

where $Z^I$ upsamples an image (zero-filling) by a factor of I, and $S_n$ is the (2D) shifting matrix corresponding to the nth PPC. In particular, let T denote the transform matrix pertinent to a HR image prior with corresponding penalty term, $\|T\underline{u}^{k,l}\|$, then it can be incorporated into our solution since $$\|T\underline{u}^{k,l}\| = \left\|\sum_{n=1}^{I^2} TS_n Z^I \Psi^{k,l} \underline{x}_n^{k,l}\right\|.$$

Examples include sparsity of the HR image in the wavelet domain, total variation (TV), and steering kernel regression (SKR) image smoothness prior.

Nevertheless, depending on the effectiveness of $\Psi^{k,l}$ in representing the PPPCs, these additional HR image priors can be superfluous, even a source of unnecessary bias (excellent dictionaries marginalize the value of additional regularization). Indeed, the crux of the bi-sensor-based solution is to super-resolve the secondary sequence of LR images by representing the PPPCs of the HR image in terms of an efficient dictionary created from the primary sequence of LR images.

However, imposing penalty terms based on HR image priors could have an advantage in the following context: $\{\underline{x}_n^{k,l}\}_n$ can only be jointly (rather than independently) estimated, unlike in equation (8). This could have a stabilizing effect on the overall estimated HR image patch, $\hat{\underline{u}}^{k,l}$, since joint estimation of $\{\underline{x}_n^{k,l}\}_n$ enforces a degree of homogeneity among reconstructed PPPCs, $\{\hat{\underline{u}}_n^{k,l}\}_n = \{\Psi^{k,l}\hat{\underline{x}}_n^{k,l}\}_n$, which is desirable since $\hat{\underline{u}}^{k,l}$ is obtained by interlacing the PPPCs.

Instead of using (costly) HR image-based penalty terms, and in keeping with the central theme of the invention, it is proposed using an anchor SPPCs (ASPPC), to enforce joint estimation of $\{\underline{x}_n^{k,l}\}_n$. Specifically, since a SPPC, $\tilde{\underline{v}}_m^{k,l}$, can be written as a weighted sum of the atoms of a secondary dictionary, $\tilde{\Psi}^{k,l}$, i.e., $\tilde{\underline{v}}_m^{k,l} = \tilde{\Psi}^{k,l}\tilde{\underline{x}}_m^{k,l}$ for m=1, ..., $J^2$, then it is now possible to invoke the prior information that any SPPC coincides with any PPPC by concurrently solving for the representations of a few SPPCs, $\{\tilde{\underline{v}}_m^{k,l} = \tilde{\Psi}^{k,l}\tilde{\underline{x}}_m^{k,l}\}_{m \in M}$, where $M\{1, 2, \ldots, J^2\} - m^*$, as follows:

$$\min_{\{\underline{x}_n^{k,l}\},\{\tilde{\underline{x}}_m^{k,l}\}} \sum_{n=1}^{I^2}\left[\|D_{m^*,n}^J \Psi^{k,l}\underline{x}_n^{k,l} - D_{m^*,n}^I \tilde{\underline{y}}^{k,l}\|_2^2 + \sum_{m \in M}\|D_{m,n}^J \Psi^{k,l}\underline{x}_n^{k,l} - D_{m,n}^I \tilde{\Psi}^{k,l}\tilde{\underline{x}}_m^{k,l}\|_2^2\right]. \quad (11)$$

$\{\tilde{\underline{x}}_m^{k,l}\}$ is referred to as 'the anchors, as they force joint estimation of $\{\underline{x}_n^{k,l}\}_n$.

Recall that $\tilde{\underline{y}}^{k,l}$ plays the role of the RSPPC, $\tilde{\underline{v}}_{m^*}^{k,l}$, and it is thus the only source of all measurements the processes and systems use to jointly solve for the representations, $\{\underline{x}_n^{k,l}\}_n$ and the anchors, $\{\tilde{\underline{x}}_m^{k,l}\}_{m \in M}$. Therefore, using fewer anchors is encouraged from this perspective. Moreover, the usefulness of anchors is contingent on the accuracy of their estimation, and their estimation error would be compounded by their large number.

On the other hand, however, larger $|M|$ increases the upper limit on the size of the primary and secondary dictionaries for the problem to be overdetermined. Specifically, equation (11) is overdetermined if the number of unknowns, $(I^2N+|M|\tilde{N})$, is smaller than $(|M|+1)pI^2$ (recall that $D_{m,n}^I \tilde{\underline{v}}_m^{k,l} \in R^p$), where $\tilde{N}$ is the dimensionality of the secondary dictionary, $\tilde{\Psi}^{k,l}$. If it is assumed both dictionaries have the same dimensionality, i.e. $\tilde{N}=N$, then there must have $N \leq \Phi(|M|) = (|M|+1)pI^2/(|M|+I^2)$ for an (over)determined equation (11), and since $\Phi(|M|)$ is monotonically increasing in $|M|$, then more anchors make equation (11) more overdetermined (or at least less underdetermined, depending on the size of the dictionaries).

Adding yet another angle to choosing the anchor set, ASPPCs that are nearest to the RSPPC are the easiest to represent in terms of a secondary dictionary created from secondary LR images. In particular, since the secondary dictionary, $\tilde{\Psi}^{k,l}$, is created from secondary LR frames, by following a similar dictionary creation process as described herein, using the RSPPC, $\tilde{\underline{v}}_{m^*}^{k,l} = \tilde{\underline{y}}^{k,l}$, as a training sample, then $\tilde{\Psi}^{k,l}$ contains $\tilde{\underline{y}}^{k,l}$ one of its atoms, and since ASPPCs nearest to the RSPPC are the most correlated with it, then the anchors $\{\tilde{\underline{x}}_m^{k,l}\}_{m \in M}$ are expected to be very sparse in $\tilde{\Psi}^{k,l}$ (and thus the easiest to represent). Based on all of the above (and experiments noted herein), only the four nearest SPPCs to the RSPPC as ASPPC are chosen, i.e.

$$M = \{m^*-1, m^*+1, m^*-J, m^*+J\}. \quad (12)$$

Incorporating the sparsity penalty term defined in equation (8) in equation (11), and enforcing a new sparsity penalty term corresponding to $\{\tilde{\underline{x}}_m^{k,l}\}_{m \in M}$ it is possible to jointly estimate $\{\underline{x}_n^{k,l}\}_n$ by minimizing the following expression with respect to both $\{\underline{x}_n^{k,l}\}_n$ and $\{\tilde{\underline{x}}_m^{k,l}\}_{m \in M}$ $$\sum_{n=1}^{I^2}\left[\|D_{m^*,n}^J \Psi^{k,l}\underline{x}_n^{k,l} - D_{m^*,n}^I \tilde{\underline{y}}^{k,l}\|_2^2 + \right. \quad (13)$$

$$\sum_{m \in M}\|D_{m,n}^J \Psi^{k,l}\underline{x}_n^{k,l} - D_{m,n}^I \tilde{\Psi}^{k,l}\tilde{\underline{x}}_m^{k,l}\|_2^2\Bigg] +$$

$$\lambda^2 \sum_{n=1}^{I^2} \zeta(\underline{x}_n^{k,l}) + \tilde{\lambda}^2 \sum_{m \in M} \tilde{\zeta}(\tilde{\underline{x}}_m^{k,l}),$$

where, $$\tilde{\zeta}(\tilde{\underline{x}}_m^{k,l}) = \left\|(\tilde{C}^{k,l})^{-1/2}\tilde{\Psi}^{k,l}\tilde{\underline{x}}_m^{k,l} - (\tilde{C}^{k,l})^{-1/2}\tilde{\underline{\mu}}^{k,l}\right\|_2^2,$$

$$\tilde{\underline{\mu}}^{k,l} = \frac{1}{\tilde{N}}\tilde{\Psi}^{k,l}\underline{1}_{\tilde{N}}, \text{ and}$$

$$\tilde{C}^{k,l} = \frac{1}{\tilde{N}}\left(\tilde{\Psi}^{k,l} - \tilde{\underline{\mu}}^{k,l}\underline{1}_{\tilde{N}}^T\right)\left(\tilde{\Psi}^{k,l} - \tilde{\underline{\mu}}^{k,l}\underline{1}_{\tilde{N}}^T\right)^T + \varepsilon I_{pI^2}.$$

Now, let M be as defined in equation (12), and let $A_{m,n}^{k,l} \triangleq D_{m,n}^J \Psi^{k,l}$, $B_{m,r}^{k,l} \triangleq -D_{m,n}^I \tilde{\Psi}^{k,l}$, $\underline{b}_{m^*,n}^{k,l} \triangleq D_{m^*,n}^I \tilde{\underline{y}}^{k,l}$, $F^{k,l} \triangleq \lambda(C^{k,l})^{-1/2}\Psi^{k,l}$, $\underline{f}^{k,l} \triangleq \lambda(C^{k,l})^{-1/2}\underline{\mu}^{k,l}$, $\tilde{G}^{k,l} \triangleq \tilde{\lambda}(\tilde{C}^{k,l})^{-1/2}\tilde{\Psi}^{k,l}$ and $\underline{g}^{k,l} \triangleq \tilde{\lambda}(\tilde{C}^{k,l})^{-1/2}\tilde{\underline{\mu}}^{k,l}$, then it becomes straightforward to show that minimizing equation (13) is equivalent to solving:

$$\min_{\underline{\alpha}^{k,l}} \|\Gamma^{k,l}\underline{\alpha}^{k,l} - \underline{\beta}^{k,l}\|_2^2, \quad (14)$$

where $$\underline{\alpha}^{k,l} \triangleq \left[(\underline{x}_1^{k,l})^T \ldots (\underline{x}_{I^2}^{k,l})^T \mid (\tilde{\underline{x}}_{m^*-1}^{k,l})^T (\tilde{\underline{x}}_{m^*+1}^{k,l})^T (\tilde{\underline{x}}_{m^*-J}^{k,l})^T (\tilde{\underline{x}}_{m^*+J}^{k,l})^T\right]^T$$

-continued $$\underline{b}^{k,l} \triangleq$$

$$[(\underline{b}_{m^*,1}^{k,l})^T \ldots (\underline{b}_{m^*,l^2}^{k,l})^T | 0 \ldots 0 | (\underline{f}^{k,l})^T \ldots (\underline{f}^{k,l})^T | (\underline{g}^{k,l})^T \ldots (\underline{g}^{k,l})^T]^T$$

$$\Gamma^{k,l} \triangleq \begin{bmatrix} A_{m^*,1}^{k,l} & 0 & & & & \\ & \ddots & & & 0 & \\ 0 & A_{m^*,l^2}^{k,l} & & & & \\ A_{m^*-1,1}^{k,l} & 0 & B_{m^*-1,1}^{k,l} & 0 & 0 & 0 \\ & \ddots & & \vdots & \vdots & \vdots & \vdots \\ 0 & A_{m^*-1,l^2}^{k,l} & B_{m^*-1,l^2}^{k,l} & 0 & 0 & 0 \\ A_{m^*+1,1}^{k,l} & 0 & 0 & B_{m^*+1,1}^{k,l} & 0 & 0 \\ & \ddots & & \vdots & \vdots & \vdots & \vdots \\ 0 & A_{m^*+1,l^2}^{k,l} & 0 & B_{m^*+1,l^2}^{k,l} & 0 & 0 \\ A_{m^*-J,1}^{k,l} & 0 & 0 & 0 & B_{m^*-J,1}^{k,l} & 0 \\ & \ddots & & \vdots & \vdots & \vdots & \vdots \\ 0 & A_{m^*-J,l^2}^{k,l} & 0 & 0 & B_{m^*-J,l^2}^{k,l} & 0 \\ A_{m^*+J,1}^{k,l} & 0 & 0 & 0 & 0 & B_{m^*+J,1}^{k,l} \\ & \ddots & & \vdots & \vdots & \vdots & \vdots \\ 0 & A_{m^*+J,l^2}^{k,l} & 0 & 0 & 0 & B_{m^*+J,l^2}^{k,l} \\ F^{k,l} & 0 & & & & \\ & \ddots & & & 0 & \\ 0 & F^{k,l} & & & & \\ & & G^{k,l} & 0 & & \\ & & & \ddots & & \\ & & 0 & G^{k,l} & & \end{bmatrix}$$

Finally, an estimate of the lth HR image patch in the kth frame, $\hat{\underline{u}}^{k,l}$, is obtained by interlacing $\{\hat{\underline{v}}_n^{k,l}\}_n = \{\Psi^{k,l}\hat{\underline{x}}_n^{k,l}\}_n$, where $\{\hat{\underline{x}}_n^{k,l}\}_n$ are computed by solving equation (14). Note that $\Gamma^{k,l}$, with size $(2|M|+J^2+1)pI^2 \times (I^2N+|M|N)$, has a sparse structure that can be taken advantage of for faster computations. To solve equation (14), use the Householder QR factorization with column pivoting (Matlab's '\' operator).

Equation (14) is solved for $l=1, \ldots, L$ to estimate all L HR image patches, $\{\hat{\underline{u}}^{k,l}\}_l$, which are then combined to form an estimate of the entire kth HR frame, $\hat{\underline{u}}^k$. An additional estimate of $\underline{u}^k$ can be obtained by dividing $\tilde{\underline{y}}^k$ into patches that overlap with the previous ones. This can be repeated to obtain multiple estimates of $\underline{u}^k$ for further reduction of noise and estimation errors, by jointly post-processing all available estimates of $\underline{u}^k$ (instead of simply averaging them as in [11]). Specifically, let $\{\hat{\underline{u}}_r^k\}_{r=1}^R$ denote the set of all R estimates of the kth HR frame, obtained by super-resolving overlapping patches of $\tilde{\underline{y}}^k$, then the processes can compute an estimate of the original (sensor-blur free) kth HR frame, $\underline{u}_o^k$, by solving $$\min_{\underline{u}_o^k} \sum_{r=1}^R \sum_{w_1} \sum_{w_2} \left\| H\underline{u}_o^k - S_{w_1,w_2}\hat{\underline{u}}_r^k \right\|_1, \quad (15)$$

where $-(\omega-1)/2 \leq w_1, w_2 \leq (\omega-1)/2$, $S_{w_1,w_2}$ shifts the rth estimate by $w_1$ and $w_2$ pixels in the horizontal and vertical direction, respectively, and H represents a user-defined blur kernel, introduced to address the two sources of blur explained below. Note that if H is the identity matrix, then solving for equation (15) is equivalent to 3-dimensional median (3DMD) filtering of the R estimates, with median window size, $\omega$, where each estimated pixel in $\hat{\underline{u}}_o^k$ is obtained by computing the median of all pixels in a neighborhood of size $\omega \times \omega \times R$. When H is used to represent blur, however, solving equation (15) amounts to joint 3DMD filtering and deblurring.

There are two sources of blur in our solution: the camera blur, which is unaccounted for in the solution model, and the blurring effect induced by 3DMD filtering, which is to be counteracted by joint deblurring (instead of applying simple 3DMD filtering, followed by deblurring).

Equation (15) can be solved using the steepest gradient descent method $$\hat{\underline{u}}_{o,t+1}^k = \hat{\underline{u}}_{o,t}^k - \eta \sum_{r=1}^R \sum_{w_1} \sum_{w_2} H^T \text{sign}(H\hat{\underline{u}}_{o,t}^k - S_{w_1,w_2}\hat{\underline{u}}_r^k),$$

where $\underline{u}_{o,t}^k$ denotes the previous estimate of $\underline{u}_o^k$ at iteration t, $\hat{\underline{u}}_{o,t+1}^k$ is the current estimate, and $\eta$ is the iteration step size. For the initial guess, use 3DMD filtered $\{\hat{\underline{u}}_r^k\}_r$, with window size, $\omega+2$. For a summary of the entire first stage of the DVSR algorithm, refer to Table I below.

TABLE I

| DVSR STAGE I |
|---|
| Input: K secondary LR frames with corresponding K primary LR frames, in addition to all user-defined parameters: p, K, d, κ, λ, $\tilde{\lambda}$, R, H, ω.<br>For k = 1 to K (estimate a sequence of K HR frames)<br>  1- Pick the kth (current) secondary frame, $\tilde{\underline{y}}^k$, to be super-resolved.<br>  2- For l= 1 to L (estimate L patches of the kth HR frame)<br>    - extract the lth patch $\tilde{\underline{y}}^{k,l}$ out of $\tilde{\underline{y}}^k$.<br>    - create the local primary and secondary LR dictionaries $\Psi^{k,l}$ and $\tilde{\Psi}^{k,l}$, respectively.<br>    - compute $\underline{u}^{k,l}$, $C^{k,l}$ and $\tilde{\underline{u}}^{k,l}$, $\tilde{C}^{k,l}$ from the atoms of $\Psi^{k,l}$ and $\tilde{\Psi}^{k,l}$, respectively.<br>    - estimate $\{\underline{x}_n^{k,l}\}_n$ by solving (14).<br>    - estimate the PPPCs, $\{\hat{\underline{v}}_n^{k,l}\}_n = \{\Psi^{k,l}\hat{\underline{x}}_n^{k,l}\}_n$.<br>    - interlace $\{\hat{\underline{v}}_n^{k,l}\}_n$ to obtain an estimate of lth patch in the kth HR frame, $\hat{\underline{u}}^{k,l}$.<br>  End<br>3 - Combine all computed HR patches, $\{\hat{\underline{u}}^{k,l}\}_{l=1}^L$, to obtain an estimate, $\hat{\underline{u}}^k$, of the kth HR frame. |

TABLE I-continued

DVSR STAGE I

4 - Repeat steps 2 and 3, for different (overlapping) patches, to obtain multiple estimates, $\{\hat{u}_r^k\}_{r=1}^R$, of the kth HR frame.
5 - Jointly post-process (15)$\{\hat{u}_r^k\}_{r=1}^R$ Obtain the final estimate, $\hat{u}_o^k$, of the kth HR frame.
End
Output: K SR frames, $\{\hat{u}_o^k\}_{k=1}^{K_t}$.

DVSR Stage II: SFSR for Each HR Frame

Although PPCs are the premise of the method of the present invention, working with them has two limitations: p, which is the number of available measurements per a PPC, must be kept very small (p=9 or 16 in our experiments) or the patch size would be too large, hindering the creation of small, local dictionaries. Furthermore, PPCs can be a liability in the sense that their estimation must be fairly accurate as to capture their subtly distinctive details. The goal herein is thus to reiterate the signal representation approach to SR, but without involving PPCs, to salvage some of the finest (low energy) details lost during the first stage of SR recovery.

In SFSR, the representation of a HR patch is estimated directly, and thus the HR patch size can be (comparatively) very small, with more measurements, and without the nuisance of overemphasizing estimation accuracy that is associated with PPCs. Therefore, a video super-resolved using the proposed setup, can be further enhanced using a simple SFSR technique. Specifically, given the previous estimate of the HR video (the output of stage I), the systems and processes of the present invention apply SFSR to super-resolve patches of each primary LR frame by representing corresponding HR patches using spatiotemporally local dictionaries, created from $\{\hat{u}_o^k\}$, as follows.

Let $y^{k,l} \in R^{\sqrt{q} \times \sqrt{q}}$ denote the lth patch in the kth LR frame, and Let $u_\Lambda^{k,l} \in R^{N\sqrt{q} \times N\sqrt{q}}$ denote the corresponding lth patch in the kth HR frame wanted to estimate.

The representation, $\underline{x}^{k,l}$, of $u_\Lambda^{k,l}$, in terms of the (local) dictionary, $\Lambda^{k,l}$, can be estimated by solving $$\min_{\underline{x}^{k,l}} \{ \|DH_{cam}\Lambda^{k,l}\underline{x}^{k,l} - \underline{y}^{k,l}\|_2^2 + \lambda_1 \|\underline{x}^{k,l}\|_1 \}, \quad (16)$$

which is the same problem as equation (4), except that the dictionary is constructed from previously estimated $\{\hat{u}_o^k\}$ by extracting spatially overlapping patches from $K_\Lambda$ super-resolved frames that are nearest (in time) to the current kth HR frame which should be estimated. In plain terms, the atoms of $\Lambda^{k,l}$ are the elements of $\{\hat{u}_{d_1,d_2}^{K,l}\}_{K,d_1,d_2}$, where $\hat{u}_{d_1,d_2}^{K,l} = R^l S_{d_1,d_2} \hat{u}_o^K$, $S_{d_1,d_2}$ is the 2D shifting matrix, $R^l$ represents the lth patch extraction, $-0.5K_A + k \leq K \leq 0.5K_A + k - 1$, $-d_A \leq d_1, d_2 \leq -d_A$. The free parameters, $K_A$ and $d_A$, are chosen such that the number of atoms, $N_\Lambda = K_\Lambda(2d_\Lambda+1)^2$, is less than their dimensionality, $ql^2$, and thus equation (16) can be replaced with $$\min_{\underline{x}^{k,l}} \left\{ \|DH_{cam}\Lambda^{k,l}\underline{x}^{k,l} - \underline{y}^{k,l}\|_2^2 + \gamma^2 \left\| \left(\sum^{k,l}\right)^{-1/2} \Lambda^{k,l}\underline{x}^{k,l} - \left(\sum^{k,l}\right)^{-1/2} \underline{m}^{k,l} \right\|_2^2 \right\}, \quad (17)$$

where, $$\underline{m}^{k,l} = \frac{1}{N_\Lambda} \Lambda^{k,l} \underline{1}_{N_\Lambda}, \text{ and}$$

$$\sum^{k,l} = \frac{1}{N_\Lambda} (\Lambda^{k,l} - \underline{m}^{k,l} \underline{1}_{N_\Lambda}^T)(\Lambda^{k,l} - \underline{m}^{k,l} \underline{1}_{N_\Lambda}^T)^T + \varepsilon I_{ql^2},$$

which is equivalent to solving $$\min_{\underline{x}^{k,l}} \left\| \begin{bmatrix} DH_{cam}\Lambda^{k,l} \\ \gamma\left(\sum^{k,l}\right)^{-1/2} \Lambda^{k,l} \end{bmatrix} \underline{x}^{k,l} - \begin{bmatrix} \underline{y}^{k,l} \\ \gamma\left(\sum^{k,l}\right)^{-1/2} \underline{m}^{k,l} \end{bmatrix} \right\|_2^2. \quad (18)$$

After computing all L HR patches, $\{\hat{u}^{k,l} = \Lambda^{k,l}\hat{\underline{x}}^{k,l}\}_{l=1}^L$, they are combined into the estimated kth HR frame, $\hat{u}_\Lambda^k$.

Although camera blur is incorporated in equation (18), it might still be desirable to include deblurring in a post-processing step, akin to what was described already herein, at least to counteract the blurring effect of the 3DMD filter. In particular, since reduction of estimation errors can benefit from computing multiple estimates, by estimating overlapping patches of the same kth HR frame, $\{\hat{u}_{\Lambda,r}^k\}_{r=1}^R$, the final estimate of the kth HR frame, $\hat{u}_{fin}^k$, can be obtained by joint 3DMD filtering and deblurring of all R estimates:

$$\min_{\underline{u}_{fin}^k} \sum_{r=1}^R \sum_{w_1} \sum_{w_2} \|H_{md}\underline{u}_{fin}^k - S_{w_1,w_2}\hat{\underline{u}}_{\Lambda,r}^k\|_1, \quad (19)$$

where $-(\bar{\omega}-1)/2 \leq w_1, w_2 \leq (\bar{\omega}-1)/2$, $\bar{\omega}$ is the desired 3DMD window size, $S_{w_1,w_2}$ is the 2D shifting matrix as defined in equation (15), and $H_{md}$ is used to control the blurring effect of 3DMD filtering.

The procedure for DVSR stage II is summarized in Table II.

TABLE II

DVSR STAGE II

Input: K primary LR frames with corresponding K SR frames from stage I in addition to all user-defined parameters: q, $K_\Lambda$, $d_\Lambda$, $H_{cam}$, $\gamma$, R, $H_{md}$, $\varpi$.
For k = 1 to K
    1- Pick the kth (current) primary frame, $\underline{y}^k$ to be super-resolved.
    2- For l = 1 to L
        - extract the lth patch $\underline{y}^{k,l}$ out of $\underline{y}^k$.
        - create spatiotemporally local HR dictionary, $\Lambda^{k,l}$, out of the SR frames from the first stage.
        - compute $\underline{m}^{k,l}$ and $\Sigma^{k,l}$ from the atoms of $\Lambda^{k,l}$.
        - estimate $\underline{x}^{k,l}$ by solving (18).
        - estimate the lth HR patch, $\underline{\hat{u}}_\Lambda^{k,l} = \Lambda^{k,l}\underline{\hat{x}}^{k,l}$.
    End
    3 - Combine all computed HR patches, $\{\underline{\hat{u}}_\Lambda^{k,l}\}_{l=1}^L$, to obtain an estimate, $\underline{\hat{u}}_\Lambda^k$, of the kth HR frame.
    4 - Repeat steps 2 and 3, for different (overlapping) patches, to obtain multiple estimates, $\{\underline{\hat{u}}_{\Lambda,r}^k\}_{r=1}^R$, of the kth HR frame.
    5- Jointly post-process equation (19) $\{\underline{\hat{u}}_{\Lambda,r}^k\}_{r=1}^R$ to obtain the final estimate, $\underline{\hat{u}}_{fin}^k$, of the kth HR frame.
End
Output: K SR frames, $\{\underline{\hat{u}}_{fin}^k\}_{k=1}^K$.

EXPERIMENTAL RESULTS

General real-world sequences with (relatively) strong aliasing are quite unamenable and, therefore, the proposed solution can be validated by virtue of the system's ability to cope with such challenging sequences.

To test the performance of the processes, the inventors downloaded HR videos that are normally used as standard test sequences in the field of video compression. These standard videos are available online and they come in different frame sizes, and different number of frames per second (fps). The videos used for the experiments are: Carphone (288×352; 30 fps), City (576×704; 30 fps), Rush Hour (1080×1920; 25 fps), Kayak (1080×1920; 25 fps), Suzie (486×720; 30 fps).

Short clips (100 frames) from the test videos, Carphone, and City were degraded as follows. Each HR frame is first blurred by a Gaussian kernel of size 4×4 and standard deviation, $\sigma=1$, decimated by 4, and then corrupted with zero-mean, white Gaussian noise (WGN), with standard deviation $\sigma=2$, resulting in the primary LR sequence. The corresponding secondary LR sequence is obtained by blurring the same original HR clip using a Gaussian kernel of size 5×5 and standard deviation, $\sigma=1$, then decimating the blurred images by 5, and finally adding WGN at zero mean and standard deviation of 2.

Short HR segments were also extracted from the Rush Hour, Kayak and Suzie sequences, and they were degraded in the same fashion described above, except for using higher downsampling rates. Specifically, because of the very high resolution (relative to the detail level) of these sequences, and in the interest of producing significant aliasing, larger downsampling factors were used. The clip from the Rush Hour video was downsampled by 12 and by 15, to create the primary and secondary LR sequences, respectively. As for the Kayak and the Suzie sequences, each was downsampled by 8 and by 10 to obtain their corresponding primary and secondary LR frames, respectively.

In all experiments, the resolution ratio between a primary LR sequence and its corresponding secondary LR sequence is 5:4, and thus the upscaling factor is ×4 (I=4) in all these experiments. The following parameters were used to obtain the results. For the first stage, the processing parameters used were: p=9 (samples), K=24 (nearest primary LR frames), d=5, $\kappa=I^2=16$ (atoms), $\lambda=\tilde{\lambda}=2$. For post-processing, 7×7 Gaussian kernel with $\sigma=1.7$, R=9 (overlapping estimates), $\omega=3$, and 50 steepest descent iterations, with step size $\eta=0.02$ was used. For the second stage, the processing parameters were: q=36 (samples), $K_\Lambda=6$ (nearest SR frames), $d_\Lambda=3$, $\gamma=2$, and a 4×4 Gaussian kernel, with $\sigma=1$, to correct for the sensor blur. The post-processing kernel was a 7×7 Gaussian kernel, with $\sigma=1$. Three overlapping estimates (R=3) were used for post-processing, with $\overline{\omega}=3$, and 50 steepest descent iterations, with step size of $\frac{1}{30}$. Using these (generic) parameters, the entire (two stage) algorithm takes about 25 seconds to estimate a HR image of size 100×100.

The inventors used slightly different parameters for City, and Kayak experiments. The different parameters for the City sequence were: p=16, $\kappa=1.5I^2$, R=16, $\omega=1$, steepest descent iteration step size of 0.035, q=49, and no post-processing for the second stage (simply taking the median of all overlapping estimates). For Kayak, the inventors used only two different parameters: $\overline{\omega}=5$, and a standard deviation of 2 for the second stage deblurring kernel.

For the sake of conciseness, the results for the Carphone, City, Rush Hour, and Kayak test sequences are presented in FIGS. 2-5, respectively, and each figure only shows the final (second stage) DVSR result of only 3 frames vs. Lanczos interpolation (of primary LR frames). FIG. 6 shows the results for Suzie.

FIGS. 1(a)-1(f) show an illustration of the property of sampling rate diversity: the relationship between PPCs corresponding to different downsampling factors (I=2 and J=I+1=3). FIG. 1(a) represents the HR image, u. In FIG. 1(b), the (gray) highlighted pixels represent the SPPC. In FIG. 1 (c) shows the 1st PPPC, with shared pixels highlighted. FIG. 1(d) shows the 2nd PPPC, with the shared pixels highlighted. FIG. 1(e) shows the 3rd PPPC, with the shared pixels highlighted. FIG. 1(f) shows the 4th PPPC, with the shared pixels highlighted.

FIG. 2 shows the results for the Carphone test sequence. The first row shows the 19th, 52nd and 80th primary LR frames, interpolated using the Lanczos method. The DVSR results of the present invention are shown in the second row.

Figure 3:
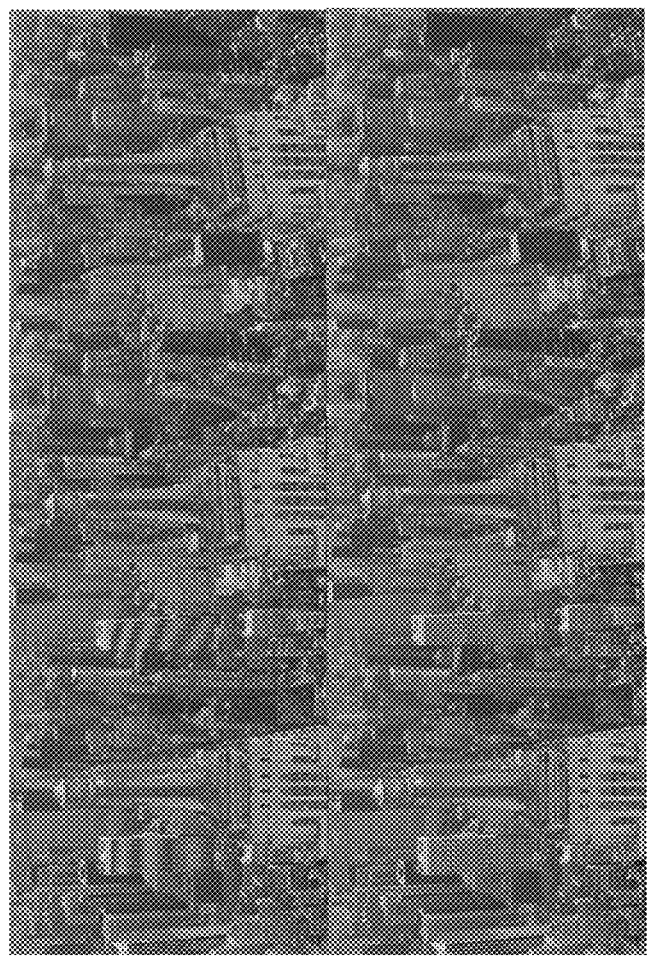
FIG. 3 shows the results for a "City" test sequence.

FIG. 3 shows the results for the City test sequence. The first row shows the 12th, 57th and 94th primary LR frames, interpolated using the Lanczos method. The DVSR results implemented with the processes and systems of the present invention are shown in the second row.

Figure 4:
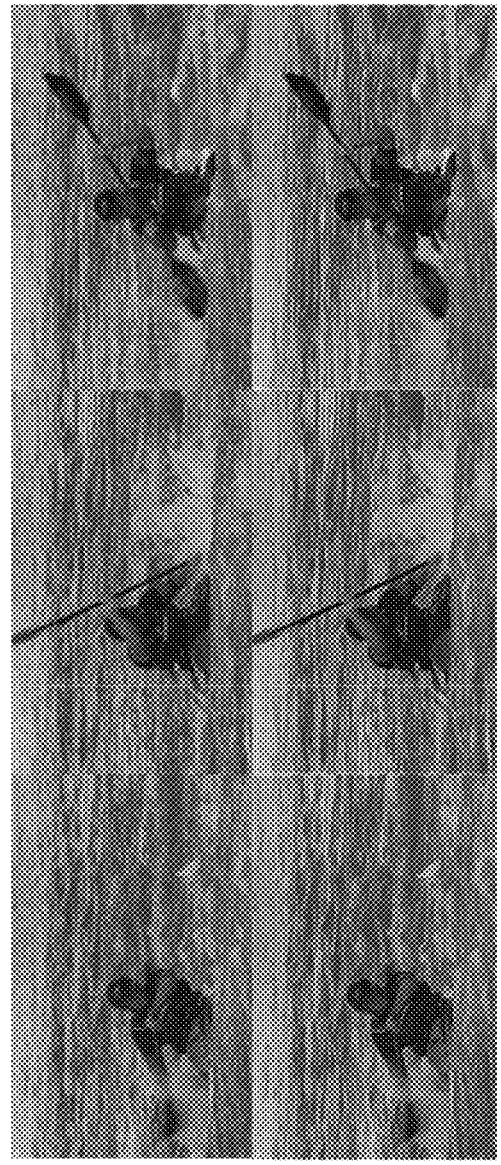
FIG. 4 shows the results for a "Kayak" test sequence.

FIG. 4 shows the results for the Kayak test sequence. The first row shows the 18th, 33rd and 76th primary LR frames, interpolated using the Lanczos method. The DVSR results implemented with the processes and systems of the present invention are shown in the second row.

Figure 5:
FIG. 5 shows the results for a "Rush Hour" test sequence.
Figure 6:
FIG. 6 shows the results for a "Suzie" test sequence.

FIG. 5 shows the results for the Rush Hour test sequence. The first row shows the 6th, 31st and 74th primary LR frames, interpolated using the Lanczos method. The DVSR results implemented with the processes and systems of the present invention are shown in the second row.

Results for the Suzie example above are provided in FIG. 6. In this figure, the 1st and 2nd rows show three secondary LR frames, and their corresponding primary LR frames, respectively. The Lanczos interpolation result of the 2nd row images is shown in the 3rd row. Super-resolving the 1st row images (secondary LR frames) gives the images shown in the 4th row, which is the SR result of the first stage of the proposed algorithm. The second stage HR estimates, shown in the 5th row, are obtained by super-resolving the primary LR frames (2nd row).

Exemplary Overview of Two Stage Processes

Overview of the First Stage

In the first stage of the SR method of the present invention, patches of the secondary LR frames are super-resolved. For example, consider a 12×12 patch, shown in FIG. 7(*a*), which is extracted from one of the (secondary) frames of the Suzie clip. The processes will super-resolve this secondary LR patch into the corresponding 60×60 HR patch shown in FIG. 7(*b*). Accordingly, the goal of FIGS. 7(*a*) and (*b*) is to show per image patch of the first SR stage is to super-resolve a secondary LR patch into a HR patch.

In a bi-sensor camera for SR, the primary set of LR frames (being of the same resolution level as that of the PPPCs of the HR image) can be useful in creating a dictionary to represent the PPPCs of the HR image. The secondary LR patch's job is to provide the DPPCs (decimated versions of the PPPCs) as described herein. By super-resolving the DPPCs into full PPPCs (with the help of a dictionary whose atoms are extracted from the primary LR frames), it is possible to now effectively super-resolve the secondary LR patch, since the estimated HR image is obtained by interlacing the estimated PPPCs.

Selection of Dictionary Atoms

Figure 8:
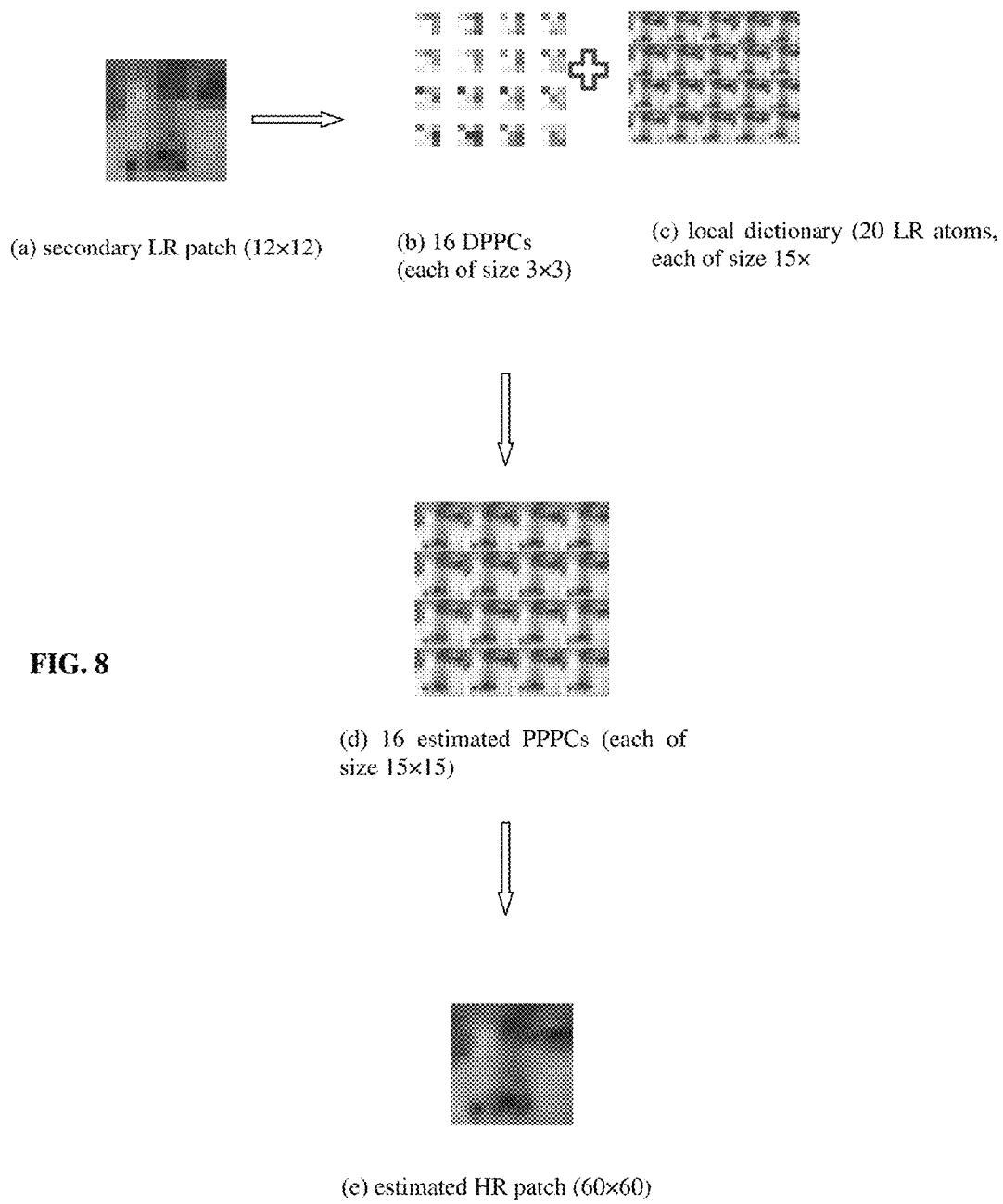
FIG. 8 shows an overview of the first stage of the SR process per patch.

The dictionaries used in the SR process have a paramount effect on the accuracy of estimation. The following is a demonstration of the construction process of the dictionary used to super-resolve the patch shown in FIG. 8(*a*). A preliminary version of the dictionary is obtained first by extracting $K(2d+1)^2$ patches, each of size 15×15, from the primary LR frames. Choosing K=24, and d=5, the processes create a spatiotemporally local preliminary dictionary with 2904 atoms, 500 (sample) atoms of which are shown in FIG. 9. From these 2904 atoms, the processes choose the 225 ($15^2$) most relevant atoms using the simple BIF feature selection method, creating an intermediate dictionary with number of atoms equal to their dimensionality. The intermediate filter is shown in FIG. 10.

Figure 11:
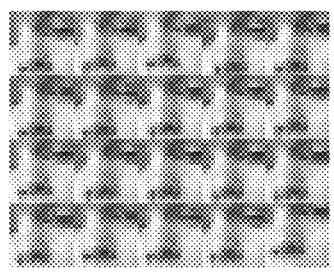
FIG. 11 shows a final dictionary contains only 20 atoms (κ=16).

Although the intermediate dictionary's atoms would seem highly correlated with the PPPCs to be represented, using the entire intermediate dictionary to represent the PPPCs is unnecessary and is in fact counterproductive. In particular, recall that the representation of a PPPC should be accurate enough as to capture the subtle details distinguishing it from other PPPCs, and since a smaller (but still representative) sub-dictionary is more useful for an accurate representation based on very few measurements, the processes further reduce the dimensionality of the dictionary using the mRMR feature selection method (in addition to BIF, as explained in already), to obtain the final dictionary, shown in FIG. 11.

Regularization

The LR frames are corrupted with sensor noise and sensor blur, and therefore, estimating the PPPCs using measurements from blurred and noisy secondary LR patch is tantamount to attempting to estimate a noisy and blurred HR patch. The objective of regularization is to suppress the sensor noise (the sensor blur is addressed in post-processing), as well as minimize estimation errors.

Generally, an SR image mainly suffers from two types of estimation errors: leftover aliasing artifacts (jaggedness) and lost fine details (softness). In the first stage of the SR method, a third type of estimation error is caused by the fact that the SR image is obtained by interlacing the estimated PPPCs, which can result in impulse noise-like artifacts (spikiness). The combination of all three types of estimation errors gives SR images that look "scaly".

Figure 12:
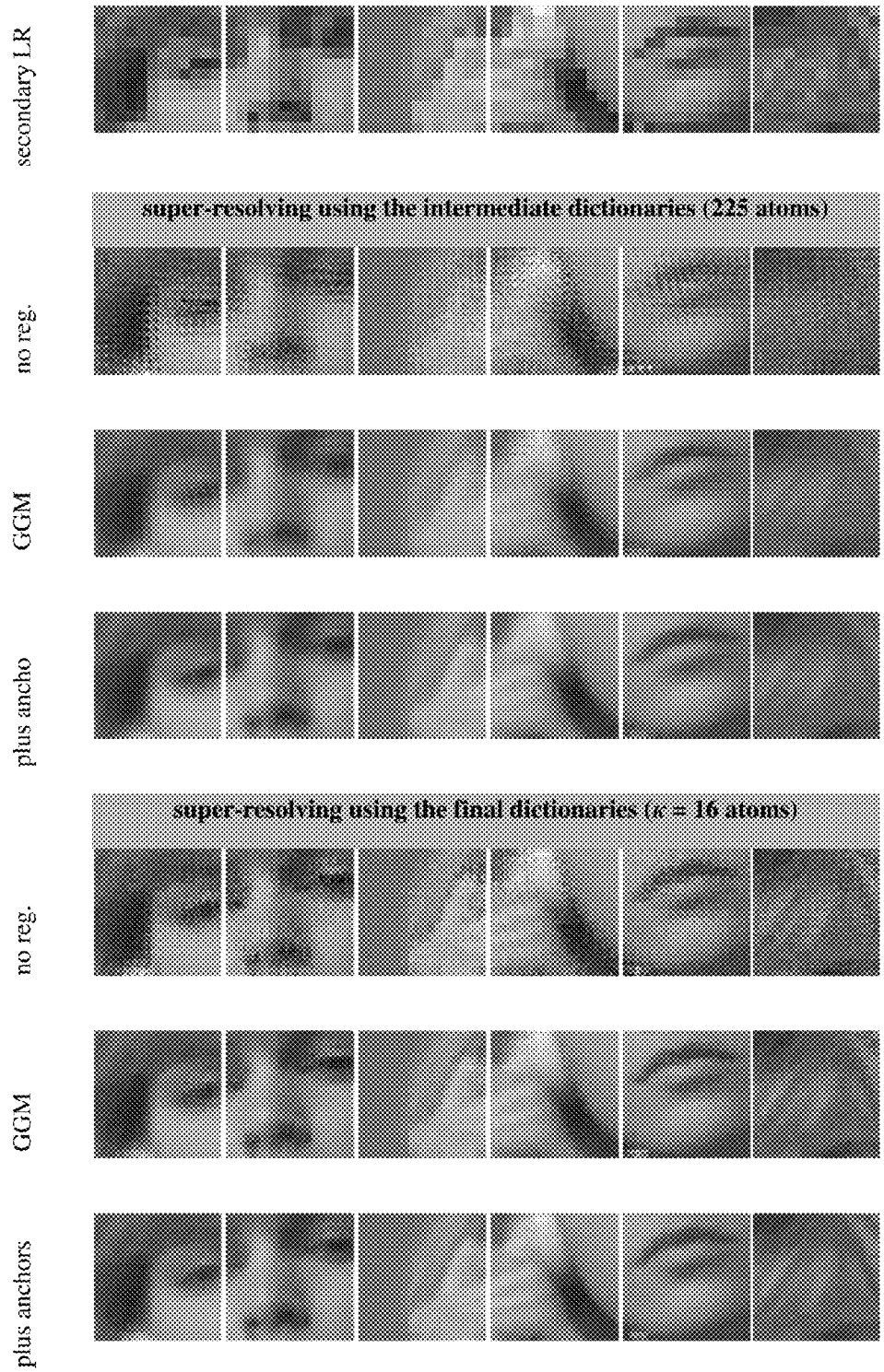
FIG. 12 shows the effect of dictionary size (intermediate vs. final) and regularization.

In FIG. 12, using intermediate and final dictionaries, it demonstrates the effect of implementing the GGM prior and adding anchors, for different SR patches, vs. no regularization. Note how the "scaling effect" diminishes and the image details become clearer with more regularization. Also, even though a final dictionary (per patch) is only a sub dictionary (of the corresponding intermediate dictionary), its small size significantly contributes to the reduction of the artifacts, and to the enhancement of detail, which demonstrates the fact that the design of the dictionary is as essential as regularization.

Post-Processing

Although the last row in FIG. 12 shows vastly improved SR results (thanks to regularization and the small size of the dictionaries), the remaining estimation errors (including the loss of the finest details due to the limits of the SR process) can be further alleviated in a post-processing step (that addresses the sensor blur as well). In particular, dividing the same frame into overlapping patches means that errors degrading an object in the reconstructed scene will be different across these patches.

Figure 13:
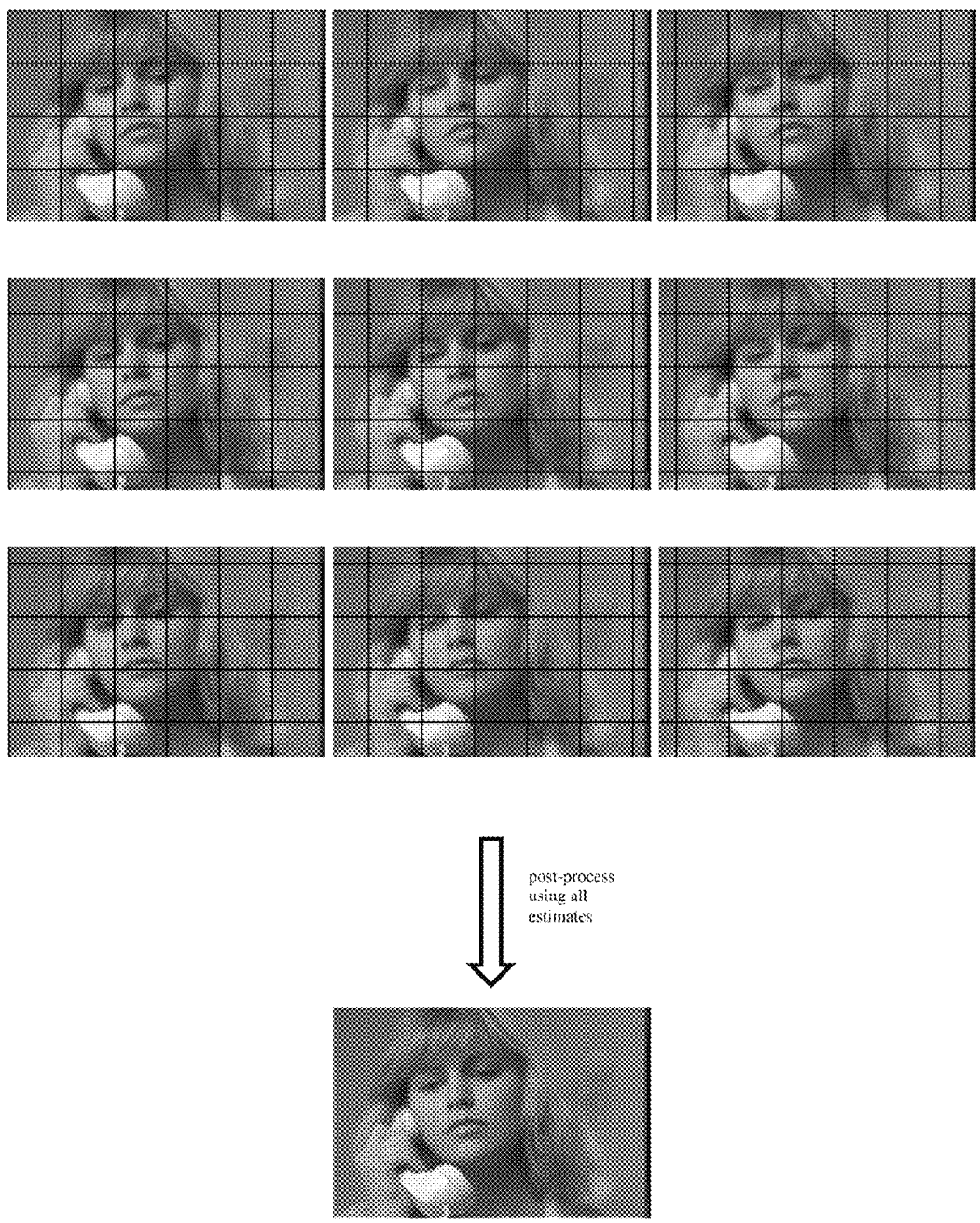
FIG. 13 shows estimating overlapping patches and post-processing all estimates to obtain the final (first stage) SR result.

For example, in FIG. 13, the level of detail in Suzie's left eye, as well as its estimation artifacts, are different across all patches that include her left eye, and therefore post-processing using all overlapping SR patches can further enhance the detail level and reduce the estimation artifacts. The other reason why estimating overlapping patches is useful is the fact that the SR frames would seem "blocky" because of processing patches (blocks) of a frame. The blocky effect would be particularly visible when playing a video of the SR frames.

Overview of the Second Stage

Signal representation-based SR methods need regularization for one reason and one reason alone: data loss and corruption. In this stage, the processes attempt to estimate the representation of the entire signal having only a few of its (noisy) samples, which is why is the smallest needed, most representative dictionary possible.

Although in the first stage, the processes created very small dictionaries with atoms that are highly correlated with one another (e.g. FIG. 8(c)) and with the PPPCs to be estimated, the number of samples used is extremely small; see FIG. 8(b), for example. The processes avoid using larger number of samples, because more samples means super-resolving larger patches and thus less efficient (larger) dictionaries would be required (for good representation). Besides the very small number of samples, the issue of interlacing the estimated PPPCs to obtain HR patch is also required, which requires high accuracy of estimation of the (highly correlated) PPPCs.

In the second stage, the processes work on smaller patches with a lot more samples to estimate the representation of only one signal, the HR patch. With more samples, and one signal to represent (per patch), the only remaining issue is the creation of a representative dictionary. Instead of using a generic set of HR images to create the dictionaries, the processes use the estimated set of HR frames to create spatiotemporally local dictionaries. In a way, the second stage, therefore, can be viewed as an iteration of the signal representation-based SR process. Now it is possible to gain the finest details of an image are usually lost during any SR process, and by iterating with more samples and smaller patches, hoping to regain some of these lost details.

Figures 14A, 14B:
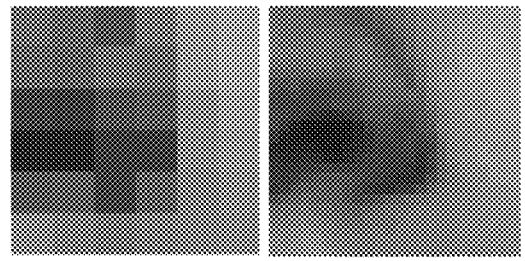
FIG. 14(a) shows a primary (noisy, blurry) 6×6 LR patch.
FIG. 14(b) shows the corresponding ideal (noise-free, blur-free) 24×24 HR patch of FIG. 14(a).

In the second stage, the secondary LR images are discarded, and the primary LR frames are now super-resolved into their HR counterparts, by super-resolving small patches. For example, consider the 6×6 patch, shown in FIG. 8(a), which is extracted from one of the (primary) LR frames of the Suzie clip. It is a hope to super-resolve this LR patch, into the corresponding 24×24 HR patch, shown in FIG. 14(b). Accordingly, the goal of FIGS. 14(a) and (b) is to show per image patch of the second SR stage is to super-resolve (small) primary LR patches into HR patches.

Figure 15:
FIG. 15 shows an overview of the second stage of the SR process per patch.
Figure 15:
Figure 15:
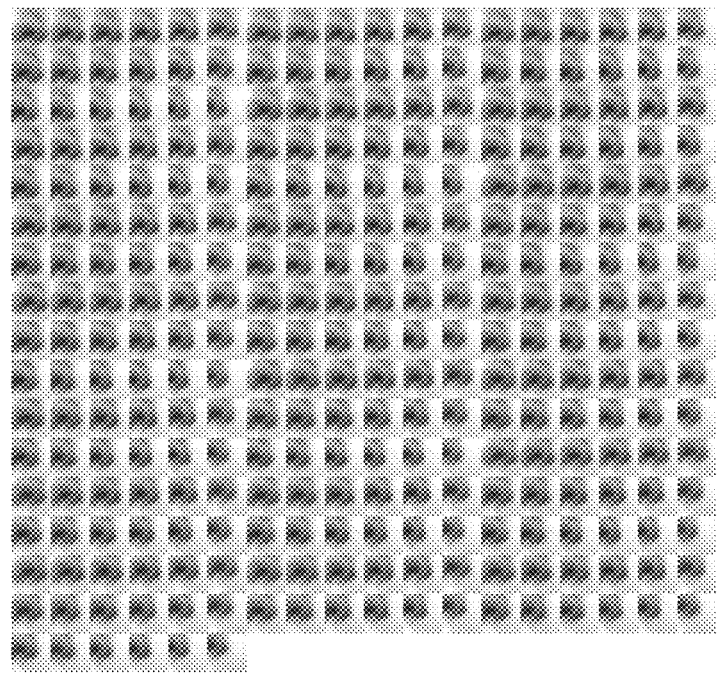
Figure 15:
Figure 15:

FIGS. 15(a)-(c) show a pictorial overview of this stage of our SR method. Compared to the series shown in FIG. 8, the series of figures in FIG. 15 highlights the advantages of the second stage: small patches, more samples, and no PPCs to estimate. FIGS. 15(a)-(c) also show the link between both stages, which is the dictionary. Specifically, in the second stage, the dictionary (per patch) is created by extracting $K_A(2d_A+1)^2$ HR patches, each of size 24×24, from the SR frames produced by the first stage. For example, the spatiotemporally local dictionary with 294 HR atoms, shown in FIG. 15 (b), is created by choosing $K_A=6$, and $d_A=3$.

Regularization

In FIG. 16(a), it is shown the estimated HR patches (using local dictionaries as described above) with and without GGM regularization. FIG. 16(b) shows super-resolved patches with visible estimation artifacts, yet these artifacts look quite different and subdued (compared to the second and filth row in FIG. 12), considering no regularization is used. Using GGM regularization, the estimation artifacts are virtually completely gone as can be seen in FIG. 16(c), unlike the case in the first stage, where a few, but still visible, artifacts remained with more loss of fine details (see the last row in FIG. 12). This comparison (in terms of estimation artifacts and loss of fine details) between the results of two stages serves as a testimony to the favorable circumstances pertaining to the second stage.

Post-Processing

Figure 17:
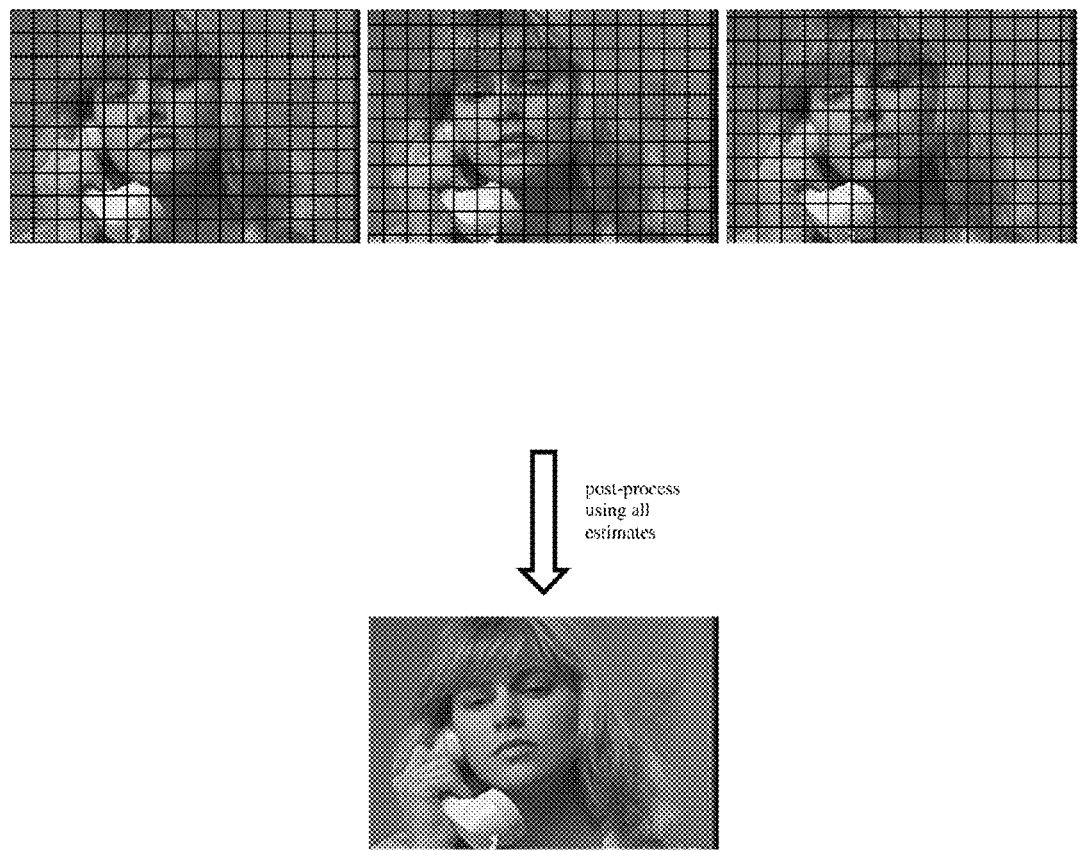
FIG. 17 shows estimating overlapping patches and post-processing all estimates to obtain the final (second stage) SR result.

If for no other reason than getting rid of the blocky artifacts, estimating overlapping patches is necessary, which is useful for a post-processing step meant to further minimize estimation errors. FIG. 17 shows multiple estimates of the same frame with overlapping patches and the end result of post-processing using all estimates.

System Environment

The present invention may be embodied as a system, method or computer program product. The present invention may take the form of a hardware embodiment, a software embodiment or any combination of software and hardware. Furthermore, the present invention may take the form of a computer program product embodied in any tangible storage medium of expression having computer-usable program code embodied in the medium. The computer-usable or computer-readable medium may be any tangible, non-transitory medium use by or in connection with the instruction execution system, apparatus, or device. The computer-usable or computer-readable medium may be, for example, an electronic, magnetic, optical, electromagnetic, infrared, or semiconductor system, apparatus, or device.

Figure 18:
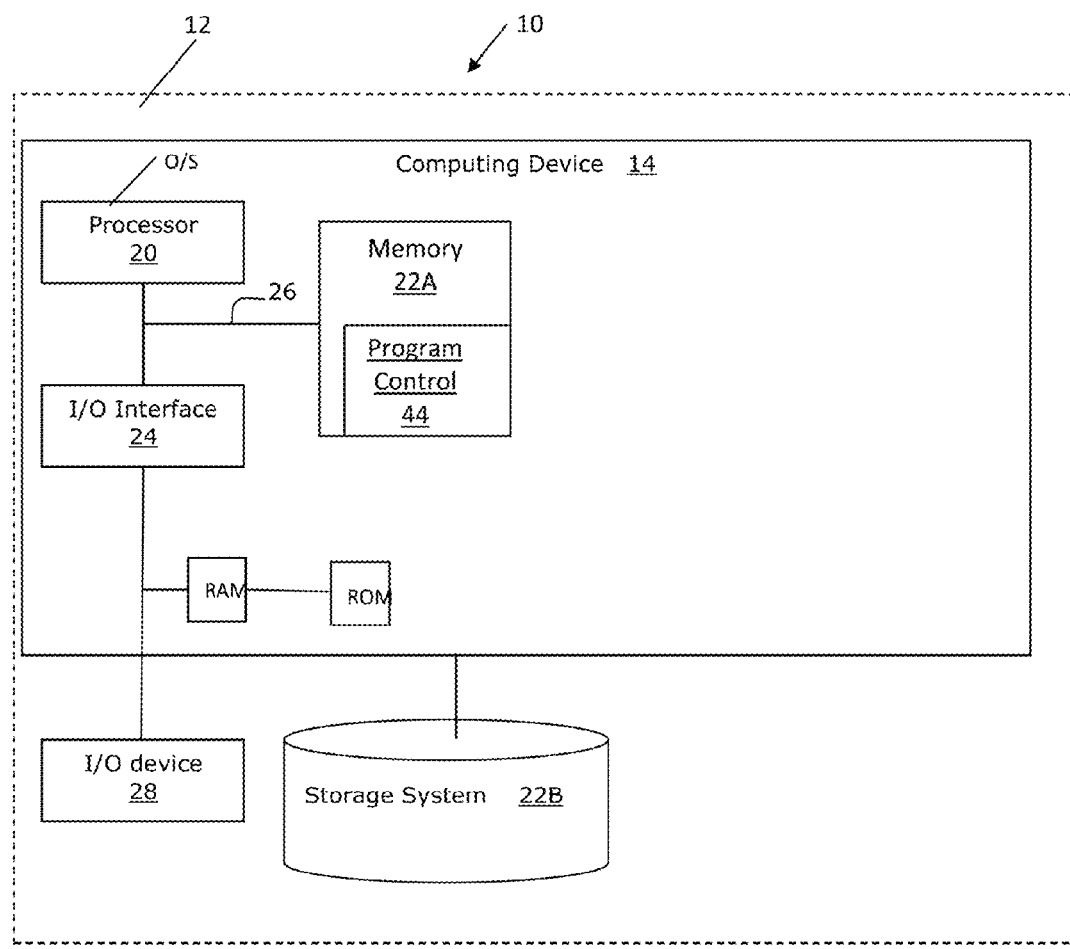
FIG. 18 shows an illustrative environment for managing the processes in accordance with the invention.

FIG. 18 shows an illustrative environment 10 for managing the processes in accordance with the invention. The environment 10 includes a server or other computing system 12 that can perform the processes described herein. The server 12 includes a computing device 14 which can be resident on a network infrastructure or computing device. The computing device 14 includes a processor 20, memory 22A, an I/O interface 24, and a bus 26. In addition, the computing device includes random access memory (RAM), a read-only memory (ROM), and an operating system (O/S).

The computing device 14 is in communication with the external I/O device/resource 28 and the storage system 22B. The I/O device 28 can comprise any device that enables an individual to interact with the computing device 14 (e.g., user interface) or any device that enables the computing device 14 to communicate with one or more other computing devices using any type of communications link.

The processor 20 executes computer program code (e.g., program control 44), which can be stored in the memory 22A and/or storage system 22B. The computer program code is computer-usable program code embodied in the medium as described herein. While executing the computer program code, the processor 20 can read and/or write data to/from memory 22A, storage system 22B, and/or I/O interface 24. The program code executes the processes of the invention such as, for example, providing the two stage processes as described herein.

Further, it should be understood by those of skill in the art that the above processes can be equally representative of a high-level block diagram or a swim-lane diagram of the invention. The steps of the flow diagram may be implemented and executed from either a server, in a client server relationship, or they may run on a user workstation with operative information conveyed to the user workstation.

Conclusion

To super-resolve dynamic sequences of images, a two-stage process is used based on the main conclusions of sparsity-based SR. The present invention super-resolves a secondary LR image (by super-resolving downsampled versions of it into full PPCs of the HR image), with the set of primary LR images being required only to create a LR basis (to represent the PPCs of the HR image). Work is performed on image patches, and feature selection is implemented to create small, (spatiotemporally) local LR dictionaries. The second stage is a reiteration of the sparsity coding approach to SR, but without the limitations of dealing with PPCs. It entails solving a classical sparsity coding based SFSR problem for each frame, but with local HR dictionaries that are extracted from the super-resolved sequence of the first stage. With the new processes in place, the bi-sensor hardware requirement demonstrates the processes ability to super-resolve highly aliased dynamic LR sequences, with favorable outcome.

The foregoing examples have been provided for the purpose of explanation and should not be construed as limiting the present invention. While the present invention has been described with reference to an exemplary embodiment, Changes may be made, within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed:

1. A computer program product comprising a non-transitory computer usable storage medium having readable program code embodied in the storage medium, the computer program product includes at least one component operable to:
   apply a single-frame super-resolution (SFSR) to super-resolve patches of each primary low-resolution (LR) frame by representing corresponding high resolution (HR) patches using spatiotemporally local dictionaries, created from $\{\hat{u}_o^k\}$;
   after computing L number of the HR patches, $\{\hat{u}_\Lambda^{k,l} = \Lambda^{k,l} \hat{x}^{k,l}\}_{l=1}^{L}$, combine them to obtain an estimated kth HR frame, $\hat{u}_\Lambda^k$;
   repeat the applying and combining for overlapping HR patches to obtain multiple estimates, $\{\hat{u}_{\Lambda,r}^k\}_{r=1}^{R}$, of the kth HR frame; and
   post-process $\{\hat{u}_{\Lambda,r}^k\}_{r=1}^{R}$ to obtain a final estimate, $\hat{u}_{fin}^k$, of the kth HR frame,
   wherein secondary LR images are discarded and super-resolving primary LR frames into their HR counterparts by super-resolving patches comprising the estimated kth HR frames.

2. A computer program product comprising a non-transitory computer usable storage medium having readable program code embodied in the storage medium, the computer program product includes at least one component operable to:
   in a first stage, super-resolving secondary low-resolution (LR) images using a set of primary LR images to create LR dictionaries to represent polyphase components (PPCs) of high resolution (HR) patches of images; and
   in a second stage, reverting to a single frame super-resolution (SR) applied to each frame which comprises an entire image, using the HR dictionaries extracted from the super-resolved sequence obtain in the first stage.

3. The computer program product of claim 2, wherein the super-resolving of the secondary LR images comprise super-resolving downsampled versions of the secondary LR images into full PPCs of HR images of dynamic scenes.

4. The computer program product of claim 2, wherein the second stage is a reiteration of a sparsity coding scheme, using only one LR sequence and without involving the PPCs.

5. The computer program product of claim 4, wherein the solving of the sparsity coding is based on a single-frame super-resolution (SFSR) problem for each frame of the primary LR image, with local HR dictionaries that are extracted from the super-resolved sequence.

6. The computer program product of claim 2, wherein the at least one component is further operable to implement Gaussian generative models to enforce sparsity in both the first stage and the second stage.

7. The computer program product of claim 2, wherein the at least one component is further operable to reduce estimation errors of the first stage by using anchors which are based on a relationship between the PPCs corresponding to different sampling rates.

8. The computer program product of claim 2, wherein in the first stage, the primary LR images are used to collect local databases of highly relevant example LR image patches to represent the PPCs of patches of an HR frame, corresponding to patches of a current secondary LR frame.

9. The computer program product of claim 8, wherein the at least one component is further operable to, for dimensionality reduction, use feature selection to create small LR dictionaries, and seeking representations of the PPCs, per patch, by solving a penalized least squares problem.

10. The computer program product of claim 2, wherein multiple estimates of a HR frame are computed by super-resolving overlapping patches of the HR image, with a final estimate obtained by jointly post-processing multiple estimates of an entire HR image.

11. The computer program product of claim 2, wherein, in the second stage, the secondary LR images do not play any role and primary LR frames are used as reference images to be super-resolved via SFSR applied per frame, where local HR dictionaries are extracted from the super-resolved sequence in the first stage to represent the HR patches of each image.

12. The computer program product of claim 2, wherein in the first stage, estimating the PPCs which are LR images, with the LR dictionaries representing them and after estimating the PPCs, in the second stage, interlacing them, resulting in an HR image.

* * * * *